US011683800B2

(12) United States Patent
Liu et al.

(10) Patent No.: US 11,683,800 B2
(45) Date of Patent: Jun. 20, 2023

(54) TRANSMITTER MULTIPLEXING IN MULTI-OPPORTUNITY SIDELINK GRANT

(71) Applicant: QUALCOMM Incorporated, San Diego, CA (US)

(72) Inventors: Chih-Hao Liu, San Diego, CA (US); Yisheng Xue, San Diego, CA (US); Jing Sun, San Diego, CA (US); Xiaoxia Zhang, San Diego, CA (US); Ozcan Ozturk, San Diego, CA (US); Tao Luo, San Diego, CA (US); Juan Montojo, San Diego, CA (US); Peter Gaal, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 17/321,132

(22) Filed: May 14, 2021

(65) Prior Publication Data

US 2022/0369344 A1 Nov. 17, 2022

(51) Int. Cl.
*H04W 4/00* (2018.01)
*H04W 72/20* (2023.01)
*H04W 74/08* (2009.01)

(52) U.S. Cl.
CPC ....... *H04W 72/20* (2023.01); *H04W 74/0808* (2013.01)

(58) Field of Classification Search
CPC .................. H04W 72/1278; H04W 74/0808
See application file for complete search history.

(56) References Cited

U.S. PATENT DOCUMENTS

| 10,952,031 B2* | 3/2021 | Maaref | H04L 5/0033 |
| 2019/0191461 A1* | 6/2019 | Lee | H04L 1/1614 |
| 2020/0029340 A1* | 1/2020 | He | H04W 76/14 |
| 2020/0322939 A1* | 10/2020 | Cao | H04W 72/02 |
| 2020/0351669 A1* | 11/2020 | Xu | H04W 72/56 |
| 2021/0127413 A1* | 4/2021 | Lu | H04W 72/40 |
| 2021/0377989 A1* | 12/2021 | Chae | H04W 72/1289 |
| 2022/0070829 A1* | 3/2022 | Kusashima | H04L 1/1861 |
| 2022/0279496 A1* | 9/2022 | Hahn | H04W 4/40 |

* cited by examiner

*Primary Examiner* — Siren Wei
(74) *Attorney, Agent, or Firm* — Patterson + Sheridan, LLP

(57) ABSTRACT

Aspects of the present disclosure provide systems and methods for assigning one or more user equipments (UEs) at one or more corresponding starting positions of multiple slots to perform channel access procedures, such as listen before talk (LBT) procedures in New Radio unlicensed band (NR-U) sidelink communications. The network entity may indicate, to a UE, a starting position in a multi-opportunity grant (e.g., a DCI scheduling multiple slots). The network entity may multiplex different transmitter UEs with different starting positions. If the channel accessing procedure is successful, the transmitter UE with the earliest starting position than the rest may block the rest of the transmitter UEs. In some cases, starting position hopping may be used so that the multiple UEs may have different priority at different slots. In some cases, the DCI may include LBT parameters that are inherited from NR-U uplink transmission configurations.

38 Claims, 15 Drawing Sheets

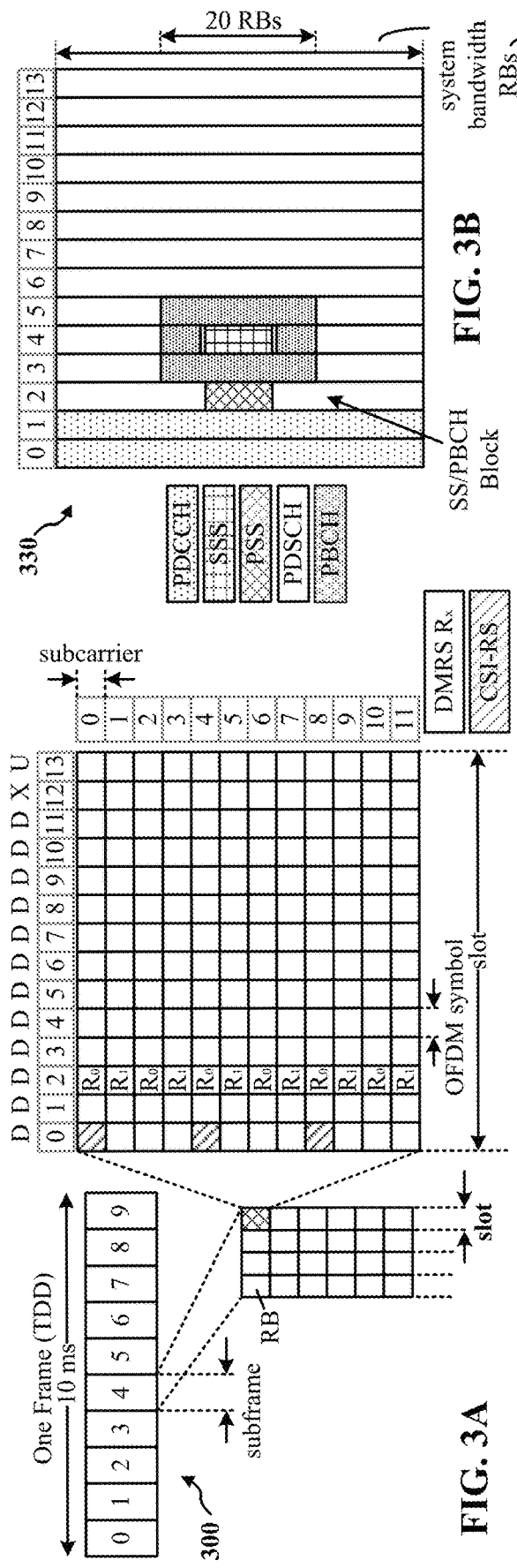
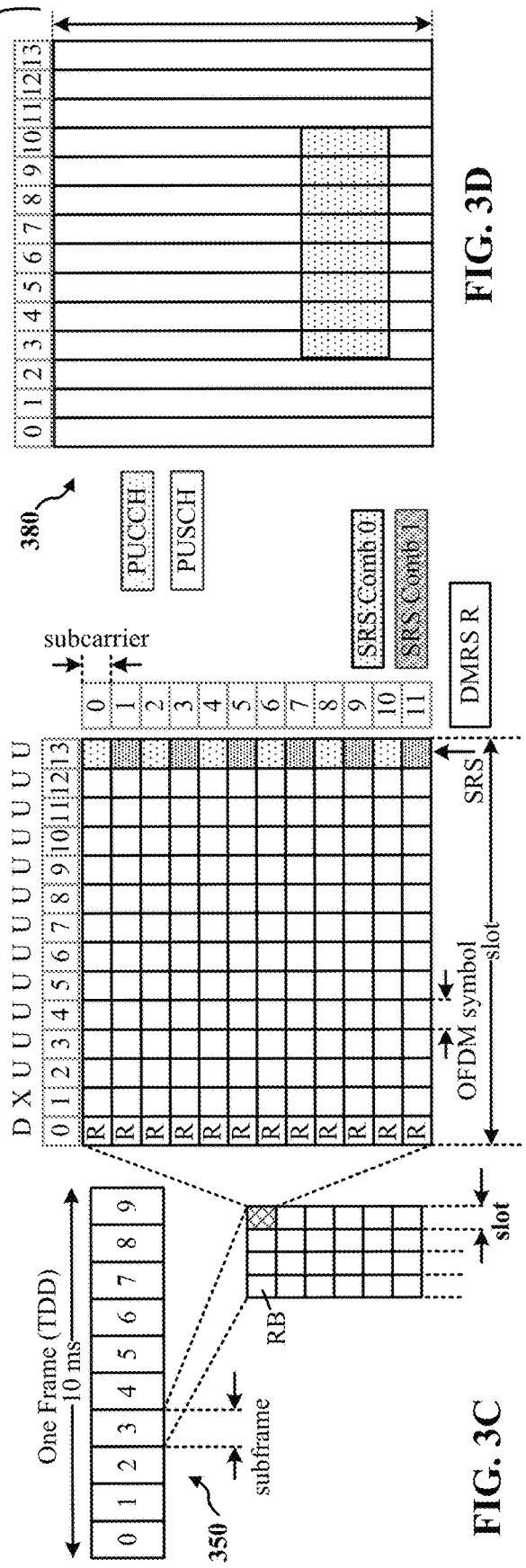

US 11,683,800 B2

TRANSMITTER MULTIPLEXING IN MULTI-OPPORTUNITY SIDELINK GRANT

INTRODUCTION

Aspects of the present disclosure relate to wireless communications, and more particularly, to techniques for sidelink communications in New Radio (NR), such as in unlicensed bands.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a network entity. The method generally includes transmitting, to at least a first user equipment (UE), at least one downlink control information (DCI) scheduling multiple slots where the first UE has multiple opportunities to transmit a physical sidelink shared channel (PSSCH) subject to a channel access procedure. The method further includes assigning the first UE at least one first starting position within the multiple slots for the first UE to perform the channel access procedure.

Another aspect provides a method for wireless communication by a user equipment (UE). The method generally includes receiving, from a network entity, at least one downlink control information (DCI) scheduling multiple slots where the first UE has multiple opportunities to transmit a physical sidelink shared channel (PSSCH) subject to a channel access procedure and an assignment of at least one first starting position within the multiple slots for the first UE to perform the channel access procedure. The method further includes transmitting a PSSCH in at least one of the multiple slots in which the first UE clears the channel access procedure in accordance with the at least one first starting position.

Another aspect provides an apparatus for wireless communications by a first user equipment (UE). The apparatus includes a memory; and at least one processor coupled to the memory. The at least one processor is configured to receive, from a network entity, at least one downlink control information (DCI) scheduling multiple slots where the first UE has multiple opportunities to transmit a physical sidelink shared channel (PSSCH) subject to a channel access procedure and an assignment of at least one first starting position within the multiple slots for the first UE to perform the channel access procedure. The at least one processor is further configured to transmit a PSSCH in at least one of the multiple slots in which the first UE clears the channel access procedure in accordance with the at least one first starting position.

Another aspect provides a non-transitory computer readable medium storing instructions that when executed by a user equipment (UE) cause the UE to: receive, from a network entity, at least one downlink control information (DCI) scheduling multiple slots where the first UE has multiple opportunities to transmit a physical sidelink shared channel (PSSCH) subject to a channel access procedure and an assignment of at least one first starting position within the multiple slots for the first UE to perform the channel access procedure. The non-transitory computer readable medium further cause s the UE to transmit a PSSCH in at least one of the multiple slots in which the first UE clears the channel access procedure in accordance with the at least one first starting position.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE FIGURES

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide systems and methods for multiplexing multiple user equipments (UEs) in multiple opportunities scheduled by a single grant, for sidelink transmissions subject to channel access procedures. For example, the grant may be a multiple slots for sidelink transmissions in a New Radio unlicensed (NR-U) band subject to a listen before talk (LBT) procedures.

According to aspects of the present disclosure, a network entity may transmit a single downlink control information (DCI) scheduling multiple slots to provide multiple UEs with multiple opportunities to transmit a physical sidelink shared channel (PSSCH). The network entity may assign different UEs different starting positions, within the multiple slots, for performing the channel access procedure. In some cases, starting position hopping may be used so different UEs have different priorities in different slots, which may prevent one UE with an earlier starting position from blocking the other UEs from gaining access to the channel.

Brief Introduction to Wireless Communication Networks

Figure 1:
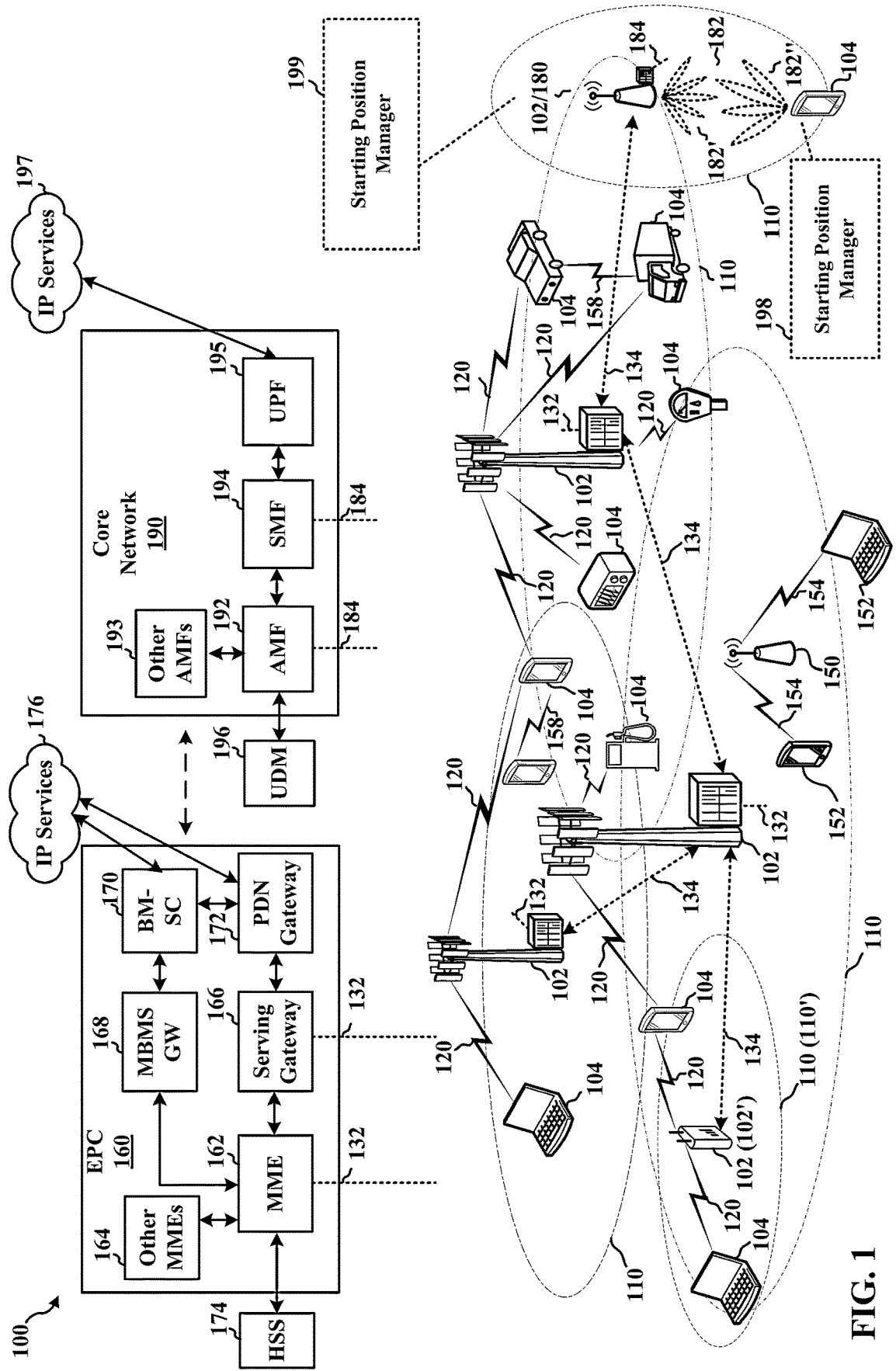
FIG. 1 is a block diagram conceptually illustrating an example wireless communication network, in accordance with certain aspects of the present disclosure.

FIG. 1 depicts an example of a wireless communications system 100, in which aspects described herein may be implemented. While FIG. 1 is briefly introduced here for context, additional aspects of FIG. 1 are described below.

Figure 10:
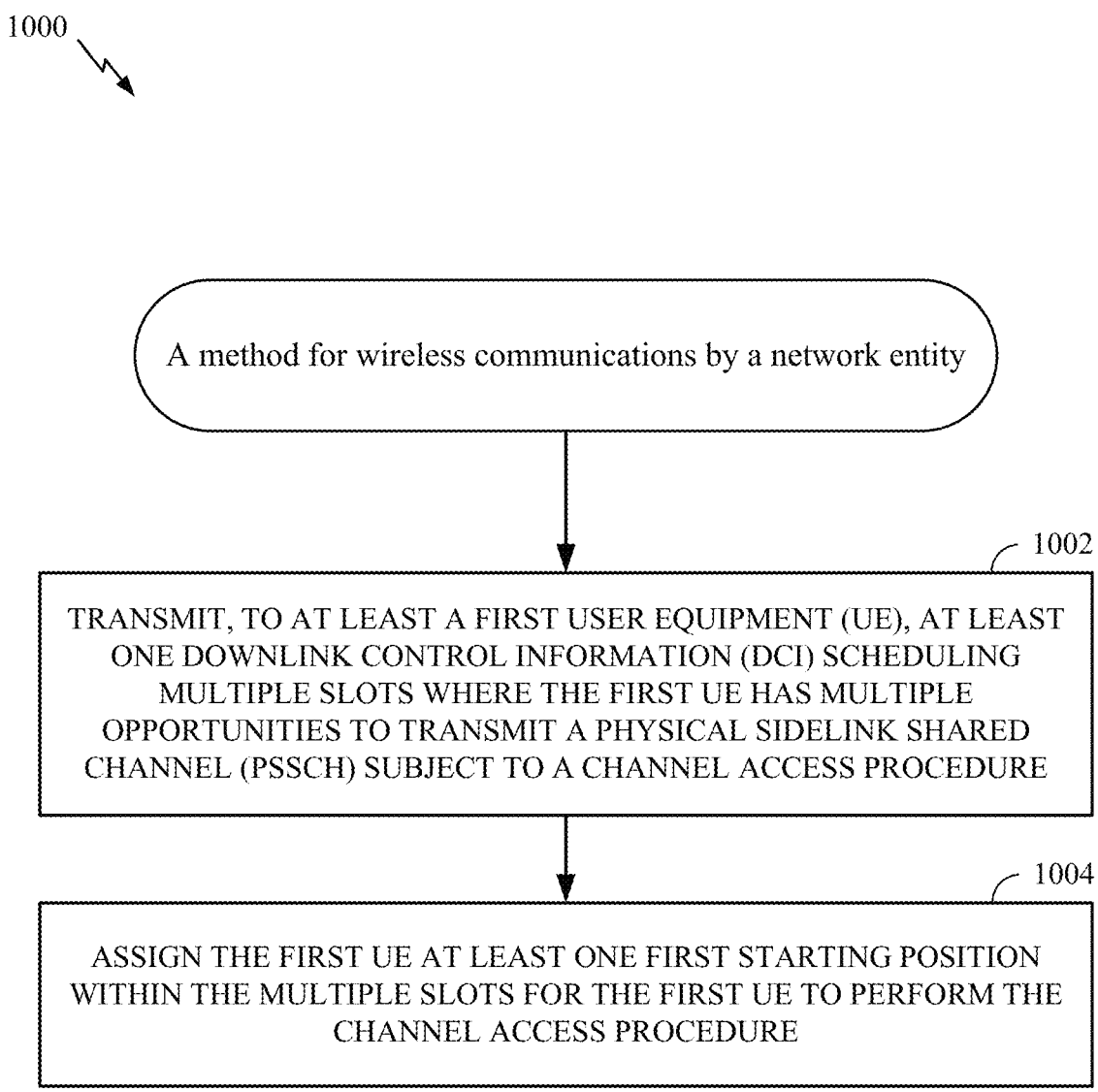
FIG. 10 depicts a flow diagram illustrating example operations for wireless communication by a network entity, in accordance with certain aspects of the present disclosure.

For example, wireless communication network 100 may include a starting position manager 199, which may be configured to perform, or cause a base station (BS) 102 to perform, operations 1000 of FIG. 10. Wireless communication network 100 may also include a starting position manager 198, which may be configured to perform, or cause a user equipment (UE) 104 to perform, operations 1100 of FIG. 11.

Generally, wireless communications system 100 includes BSs 102, UEs 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. BSs 102 may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

BSs 102 wirelessly communicate with UEs 104 via communications links 120. Each of BSs 102 may provide communication coverage for a respective geographic coverage area 110, which may overlap in some cases. For example, small cell 102' (e.g., a low-power BS) may have a coverage area 110' that overlaps the coverage area 110 of one or more macrocells (e.g., high-power BSs).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Figure 2:
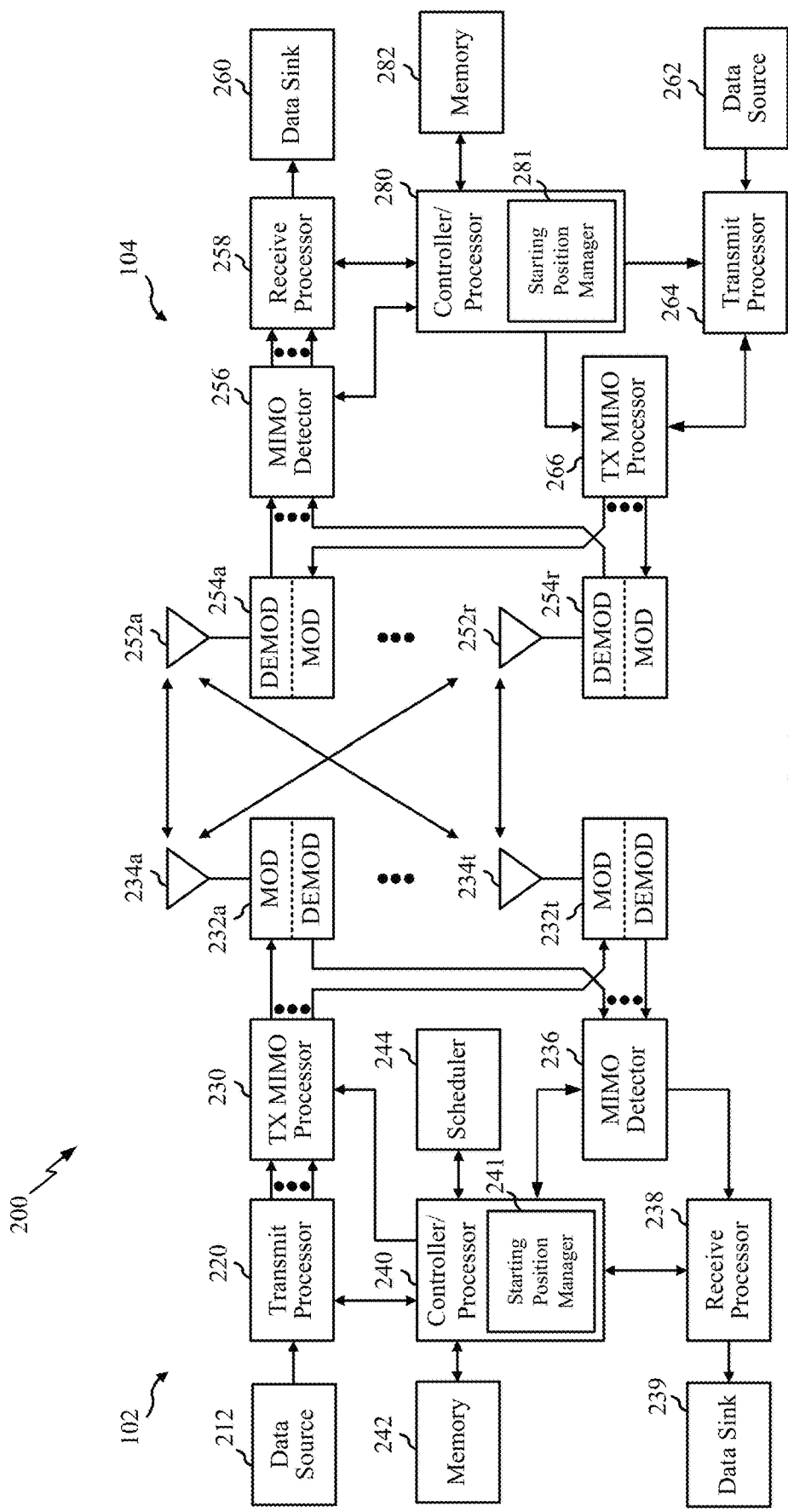
FIG. 2 is a block diagram conceptually illustrating aspects of an example a base station (BS) and user equipment (UE), in accordance with certain aspects of the present disclosure.

FIG. 2 depicts certain example aspects of a BS 102 and a UE 104. As with FIG. 1, FIG. 2 is briefly introduced here for context and additional aspects of FIG. 2 are described below.

Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes a starting position manager 241, which may be representative of the starting position manager 199 of FIG. 1. Notably, while depicted as an aspect of controller/processor 240, the starting position manager 241 may be implemented additionally or alternatively in various other aspects of BS 102 in other implementations.

Generally, UE 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., source data 262) and wireless reception of data (e.g., data sink 260).

UE 104 includes controller/processor 280, which may be configured to implement various functions related to wireless communications. In the depicted example, controller/processor 280 includes a starting position manager 281, which may be representative of the starting position manager 198 of FIG. 1. Notably, while depicted as an aspect of controller/processor 280, the starting position manager 281 may be implemented additionally or alternatively in various other aspects of UE 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Brief Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 µs often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Brief Introduction to NR Sidelink Communications

Figure 4B:
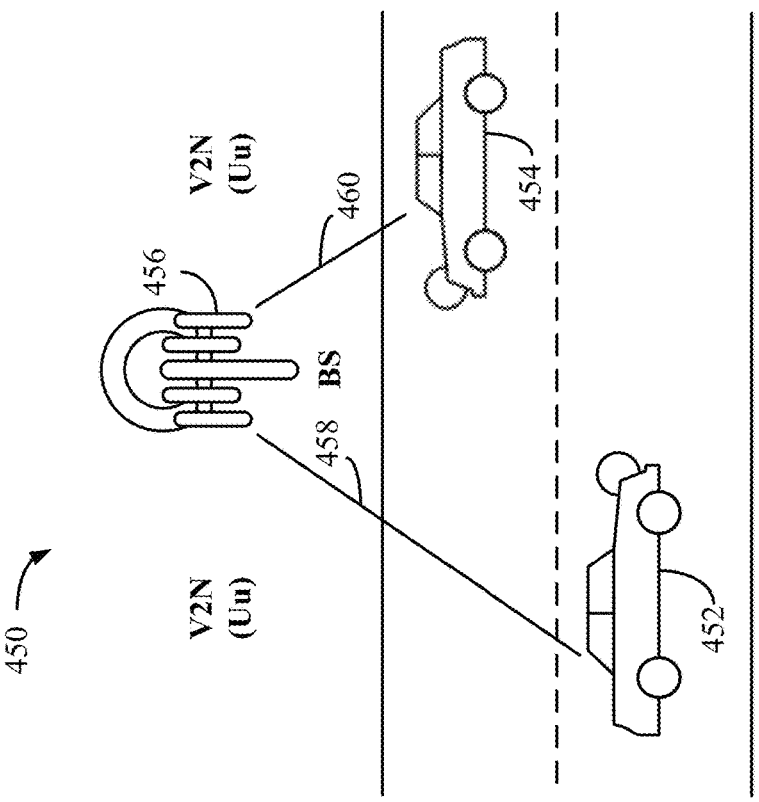
FIG. 4A and FIG. 4B show diagrammatic representations of example vehicle to everything (V2X) systems, in accordance with certain aspects of the present disclosure.
Figure 4A:
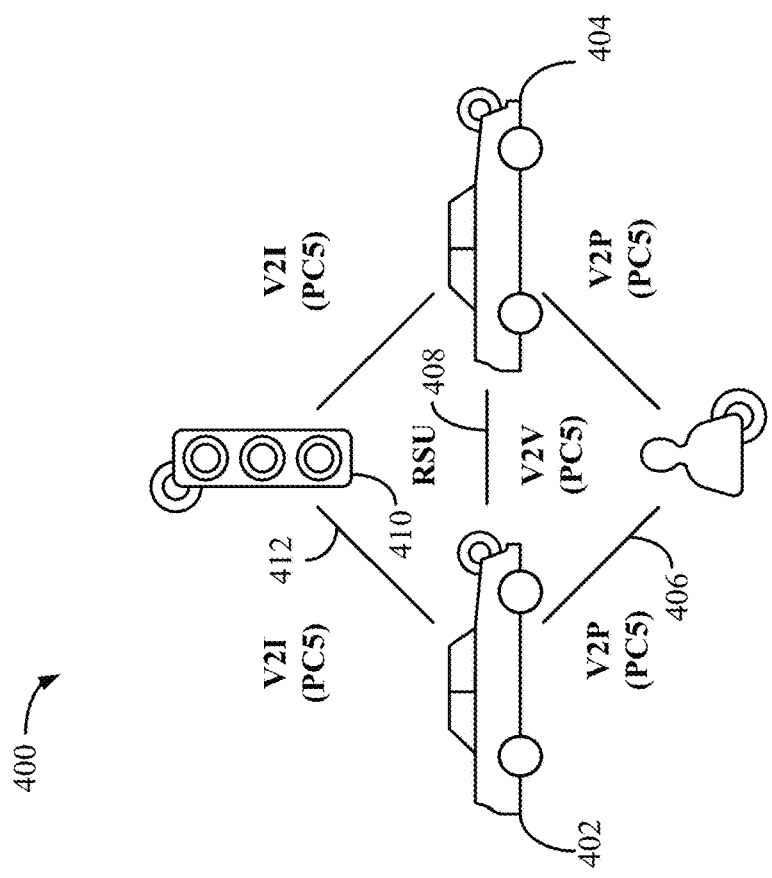

FIG. 4A and FIG. 4B show diagrammatic representations of example vehicle-to-everything (V2X) systems, in accordance with some aspects of the present disclosure. Although V2X systems are common applications of sidelink communications, sidelink communications are not limited to V2X system and may be used in any UE-to-UE applications. As shown, the vehicles shown in FIG. 4A and FIG. 4B may communicate via sidelink channels and may relay sidelink transmissions as described herein.

The V2X systems provided in FIG. 4A and FIG. 4B provide two complementary transmission modes. A first transmission mode (also referred to as mode 4), shown by way of example in FIG. 4A, involves direct communications (for example, also referred to as sidelink communications) between participants in proximity to one another in a local area. A second transmission mode (also referred to as mode 3), shown by way of example in FIG. 4B, involves network communications through a network, which may be implemented over a Uu interface (for example, a wireless communication interface between a radio access network (RAN) and a UE).

Referring to FIG. 4A, a V2X system 400 (for example, including vehicle-to-vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, highway component 410), such as a traffic signal or sign (V2I) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 4B shows a V2X system 450 for communication between a vehicle 452 and a vehicle 454 through a network entity 456. These network communications may occur through discrete nodes, such as a BS (e.g., the BS 102*a*), that sends and receives information to and from (for example, relays information between) vehicles 452, 454. The network communications through vehicle to network (V2N) links 458 and 460 may be used, for example, for long-range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

Roadside units (RSUs) may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NodeB-type RSUs have similar functionality as a Macro eNB or gNB. The Micro NodeB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

According to aspects of the present disclosure, a UE may reserve one or more (e.g., up to two) future resources (e.g., in addition to a current resource) for a transmission (e.g., for re-transmission of a packet).

Figure 5:
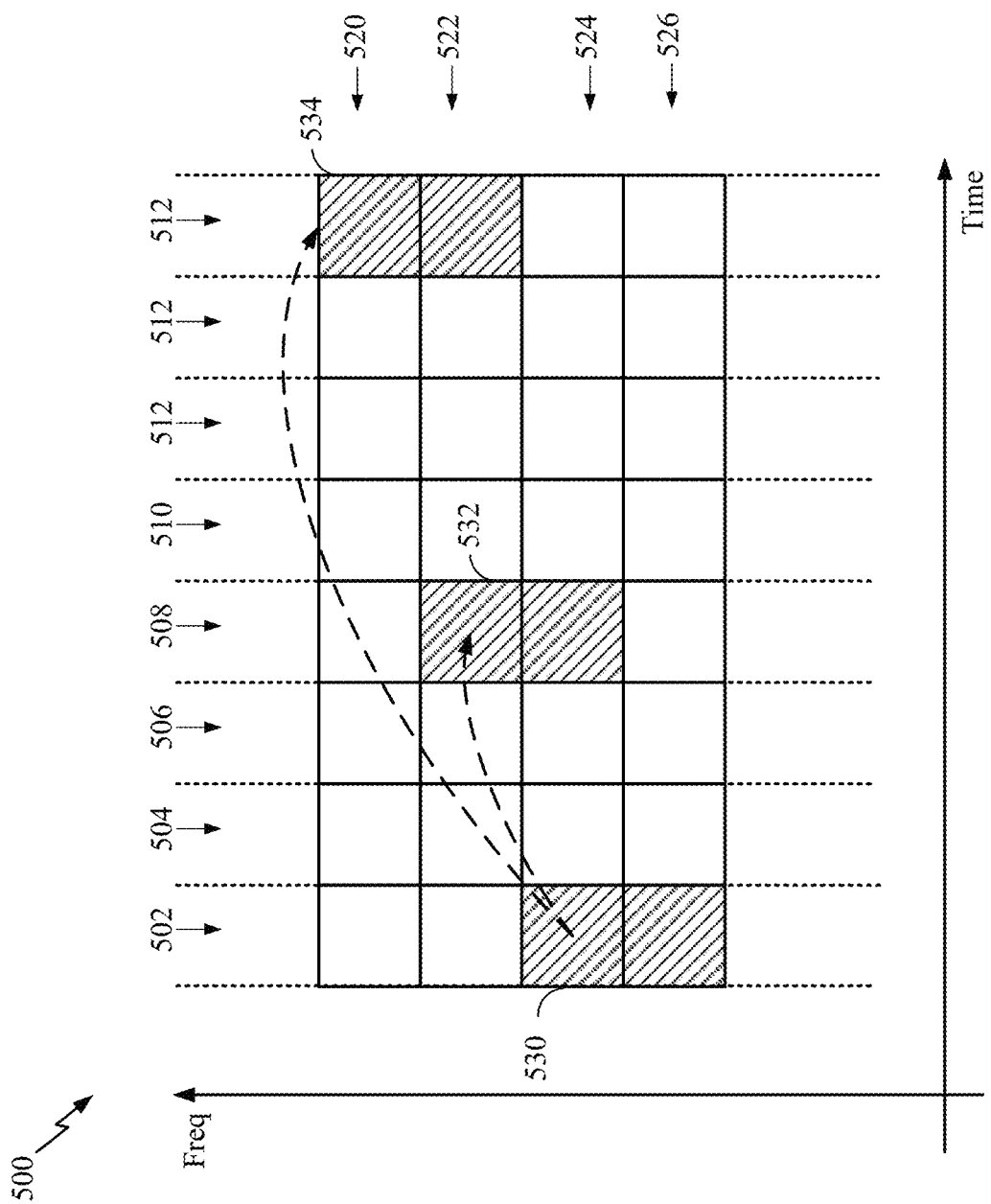
FIG. 5 is an exemplary transmission timeline illustrating transmissions and resource reservations by a CV2X device, in accordance with aspects of the present disclosure.

FIG. 5 is an exemplary transmission timeline 500 illustrating transmissions and resource reservations by a CV2X device, in accordance with aspects of the present disclosure. In the exemplary transmission timeline, a UE (e.g., UE 104, shown in FIG. 1) that is a CV2X device transmits a sidelink transmission 530 during a slot 502 on the subchannels 524 and 526. The transmission includes data and control information that may be sent in a physical sidelink control channel (PSCCH), for example. The control information that the UE includes in transmission 530 reserves transmission resources on subchannels 522 and 524 during slot 508, as shown at 532. The control information in transmission 530 also reserves transmission resources on subchannels 520 and 522 during slot 512, as shown at 534. The transmission resources may be reserved for retransmissions of the data in the sidelink transmission 530, for example.

Channel access and resource reservation may be based on sensing of the channel by a UE with data to transmit. In an example, the UE first identifies available resources for sidelink transmissions, which may be referred to as candidate resources. The UE then selects one or more resources, from the candidate resources, for transmission of a data or control signal. To identify available resources, the UE monitors and decodes all transmissions on the channel. The UE also measures reference signal received power (RSRP) for each of the transmissions the UE attempts to decode. The UE determines reserved resources (e.g., reserved by other UEs) according to control information in the decoded transmissions which have RSRP above a threshold.

The UE may then consider other resources that are not reserved as available or candidate resources, and the UE may transmit control information reserving some of the candidate resources. When a packet arrives for transmission (e.g., arrives at lower protocol layer from a higher protocol layer in a protocol stack of the UE), the UE determines a sensing window (a window in the past), determines available resources based on SCI decoding and/or RSRP measurement in the sensing window, and then identifies available resources in a resource selection window (a window in the future) by projecting the decoding and/or measurement outcomes from the sensing window to the selection window.

In some cases, to identify available resources, a UE may decode SCI to determine whether a resource in a selection window has been reserved; the measured RSRP may also be projected to a corresponding future resource, if the resource is reserved. A UE may determine a resource is available if the resource is not reserved or if the resource is reserved but RSRP of the signal is less than an RSRP threshold.

According to aspects of the present disclosure, to select a resource to use for a transmission, a UE may randomly select from the available resources.

Figure 6:
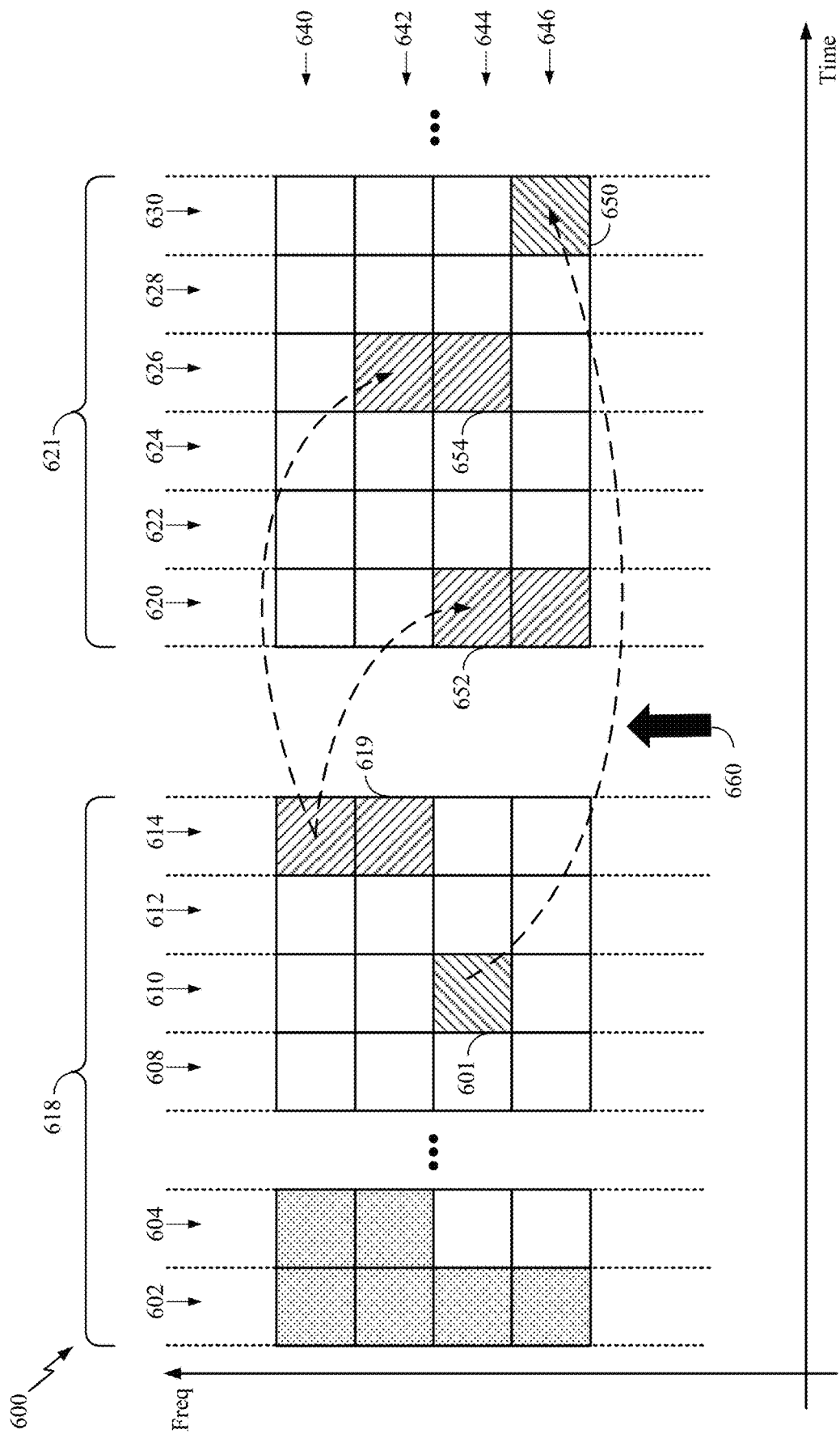
FIG. 6 is an exemplary transmission timeline illustrating resource selection for transmission by a CV2X device, in accordance with aspects of the present disclosure.

FIG. 6 is an exemplary transmission timeline 600, illustrating resource selection for transmission by a CV2X device, in accordance with aspects of the present disclosure. The exemplary transmission timeline includes slots 602, 604, 608, 610, 612, 614, 620, 622, 624, 626, 628, and 630, as well as sub-channels 640, 642, 644, and 646. In the exemplary transmission timeline, a UE (e.g., UE 104, shown in FIG. 1) that is a CV2X device has a packet arrive for transmission at 660.

The UE attempts to decode control information during a sensing window 618. The UE determines that control information at 601 (in slot 610 on sub-channel 644) reserves transmission resources in a selection window 621 on sub-channel 646 during slot 630, as shown at 650. The control information at 619 (in slot 614 on sub-channels 640 and 642) reserves transmission resources on subchannels 644 and 646 during slot 620, as shown at 652, in accordance with aspects of the present disclosure. The control information at 619 also reserves transmission resources on subchannels 642 and 644 during slot 626, as shown at 654, in accordance with aspects of the present disclosure.

An NR V2X or sidelink communication system may use a HARQ feedback mechanism. In an example, a first UE in an NR V2X system may transmit a data channel, and a second UE that received the transmission may send an ACK or NACK to indicate whether the second UE successfully decoded the data. When a UE transmits data in a sidelink communication (e.g., via a physical sidelink shared channel (PSSCH)), the UE may receive HARQ feedback from other UEs receiving the sidelink communication. In an example, the HARQ feedback may be negative acknowledgment only (NACK-only) feedback, wherein a receiving UE sends a NACK when decoding of the data fails and sends nothing when decoding of the data is successful. In another example, the HARQ feedback may be ACK/NACK feedback, wherein a receiving UE sends a NACK when decoding of the data fails and sends an acknowledgment (ACK) when decoding of the data is successful.

HARQ feedback transmission (e.g., in a physical sidelink feedback channel (PSFCH)) may happen in a configured or preconfigured PSFCH resource, which occurs in every N slots, for example where N may be 0, 1, 2, or 4. In an example, the resource used for HARQ feedback transmission acknowledging a PSSCH is determined (e.g., determined by the UE transmitting the HARQ feedback) based on: the time and frequency resources of the PSSCH; the transmitter UE identifier (ID); the receiver UE ID, if the HARQ feedback is for ACK/NACK based groupcast communication; and the type of the feedback (e.g., ACK or NACK). In an example, each HARQ feedback is transmitted in one PRB (e.g., twelve consecutive subcarriers) and two OFDM symbols in a PSFCH slot.

HARQ feedback may have two modes: NACK-only and ACK/NACK. In an example, the HARQ feedback may be NACK-only feedback, wherein a receiving UE sends a NACK when decoding of the data fails and sends nothing when decoding of the data is successful. In another example, the HARQ feedback may be ACK/NACK feedback, if a receiving UE sends a NACK when decoding of the data fails and sends an acknowledgment (ACK) when decoding of the data is successful.

Multiple PSFCH resources may be configured corresponding to a PSSCH transmission. In an example, multiple resources may be used for groupcast ACK/NACK feedback, so different receiving UEs in the group may each transmit feedback in a different PSFCH resource. In a situation where multiple transmitting UEs transmit data in a same resource (e.g., a data collision), multiple HARQ resource mapping (e.g., multiple HARQ resources for each of the PSSCHs that collided) may alleviate a potential collision between the HARQ transmissions.

Figure 7A:
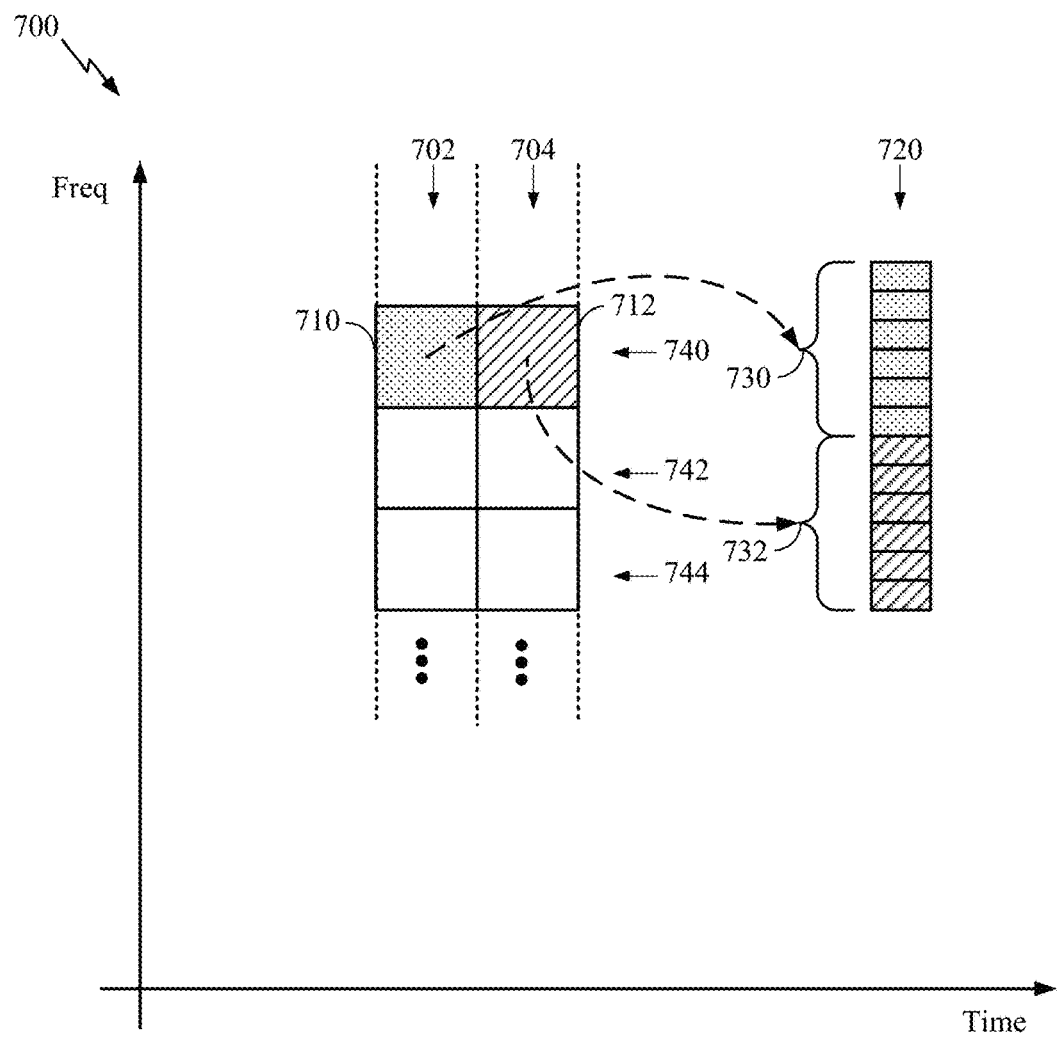
FIGS. 7A and 7B are example transmission timelines 700 and 750 of sidelink communications, according to aspects of the present disclosure.
Figure 7B:
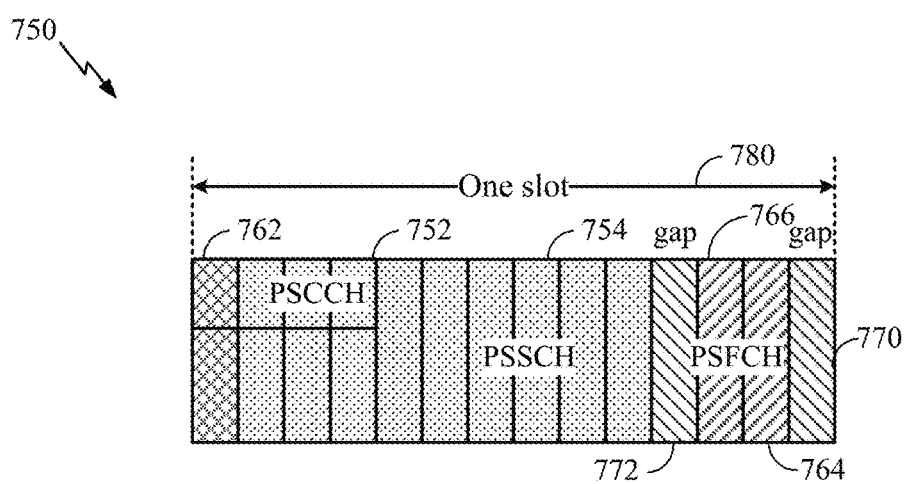

FIGS. 7A and 7B are example transmission timelines 700 and 750 of sidelink communications, according to aspects of the present disclosure. The exemplary transmission timeline 700 includes slots 702 and 704, OFDM symbol 720, and sub-channels 740, 742, and 744. In the transmission timeline 700, a UE (e.g., UE 104, shown in FIG. 1) transmits data via a sidelink channel (e.g., a physical sidelink shared channel (PSSCH)) at 710 and 712. Another UE (e.g., UE 104b, shown in FIG. 1) receives the data transmissions and transmits HARQ feedback for the transmissions during OFDM symbol 720. Each of the transmissions 710 and 712 has a corresponding set of configured resources 730 or 732 for the HARQ feedback in a PSFCH resource. Each of the configured resources 730 and 732 includes six subcarriers during the OFDM symbol 720.

The PSFCH resources may include frequency domain and code domain (e.g., cyclic shifted (CS)) resources. In the transmission timeline 750, PSFCH resources are configured in the symbols 764 and 766 of a slot 780 on a sub-channel 770. A UE (e.g., UE 104, shown in FIG. 1) transmits a physical sidelink control channel (PSCCH) 752 that allocates other symbols in the slot 780 for a physical sidelink shared channel (PSSCH) 754. The UE may transmit an automatic gain control (AGC) symbol in the OFDM symbol 762. Another UE, (e.g., UE 104b, shown in FIG. 1) receives the PSCCH and the PSSCH. The other UE transmits HARQ feedback regarding another PSSCH (e.g., another PSSCH transmitted two slots earlier) on a PSFCH during the symbols 764 and/or 766. Both UEs may refrain from transmitting during the final symbol 570 (e.g., a gap symbol) of the slot and during the symbol 572 (e.g., another gap symbol) immediately before the symbol 566.

As discussed, if a receiving UE experiences high interference while receiving a sidelink transmission, then the receiving UE may fail to decode the sidelink transmission, causing the transmitting UE to retransmit the sidelink transmission. If the high interference continues, then the receiving UE may fail to decode the retransmission, wasting transmission resources and increasing latency of the transmissions.

Accordingly, it is desirable to develop techniques and apparatus for transmitting and receiving joint feedback, for a sidelink communication, that includes hybrid automatic retransmission request (HARD) feedback and an indication of a measure of energy level of the sidelink transmission.

Example Mode 1 Grant for Sidelink Communication in Unlicensed Spectrum

Aspects of the present disclosure relate to wireless communications, and more particularly, to techniques for transmitter multiplexing in multi-opportunity sidelink grant. For example, one or more user equipments (UEs) are assigned at one or more corresponding starting positions of multiple slots to perform channel access procedures, such as listen before talk (LBT) procedures. The network entity may indicate, to a UE, a starting position in a multi-opportunity grant (e.g., a DCI scheduling multiple slots). The network entity may multiplex different transmitter UEs with different starting positions. If the channel accessing procedure is successful, the transmitter UE with the earliest starting position than the rest may block the rest of the transmitter UEs. In some cases, starting position hopping may be used so that the multiple UEs may have different priority at different slots. In some cases, the DCI may include LBT parameters that are inherited from NR-U uplink transmission configurations.

Current cellular V2X communication designs target deployments in licensed spectrum. Such designs typically either share spectrum in a licensed cellular band or dedicated ITS (intelligent transportation system) spectrum. In the licensed cellular spectrum, V2X systems share uplink spectrum in a cellular network. In dedicated ITS spectrum there are spectrums around 5.9 GHz allocated for V2X in some regions. The dedicated spectrum is not guaranteed in some regions due to scarcity of spectrum. For example, in some areas/countries, there is dedicated spectrum allocated for LTE V2X (specified in LTE Release-14 and Release-15), but no spectrum available for NR V2X (specified in NR Release-16 targeting advanced V2X use cases like autonomous driving).

As a result, it is likely that cellular V2X communications will be deployed in unlicensed spectrum, given that it might be the only option in some regions. However, unlicensed spectrum may be shared by other technologies like Wi-Fi. For this reason, use of unlicensed spectrums is typically subject to various regulatory requirements depending on the region. One of the requirements is listen before talk (LBT): which mandates that a device only transmits (talk) in an unlicensed channel if the channel is sensed (by listening) to be free.

LBT is a form of a clean channel assessment (CCA) procedure that typically involves measuring energy or power in the channel for a certain duration of time. Exactly when devices transmit may depend on a particular category of LBT. For a category 2 (CAT 2) LBT, the device transmits if the CCA indicates the channel is free; e.g., Type 2 channel access procedures as specified in 3GPP. For a category 4 (CAT 4) LBT, the device performs random back-off within a contention window (extended CCA) if CCA indicates the channel is free, and transmits only when channel is still free during the back-off period; e.g., Type 1 channel access procedures as specified in 3GPP.

Figure 8:
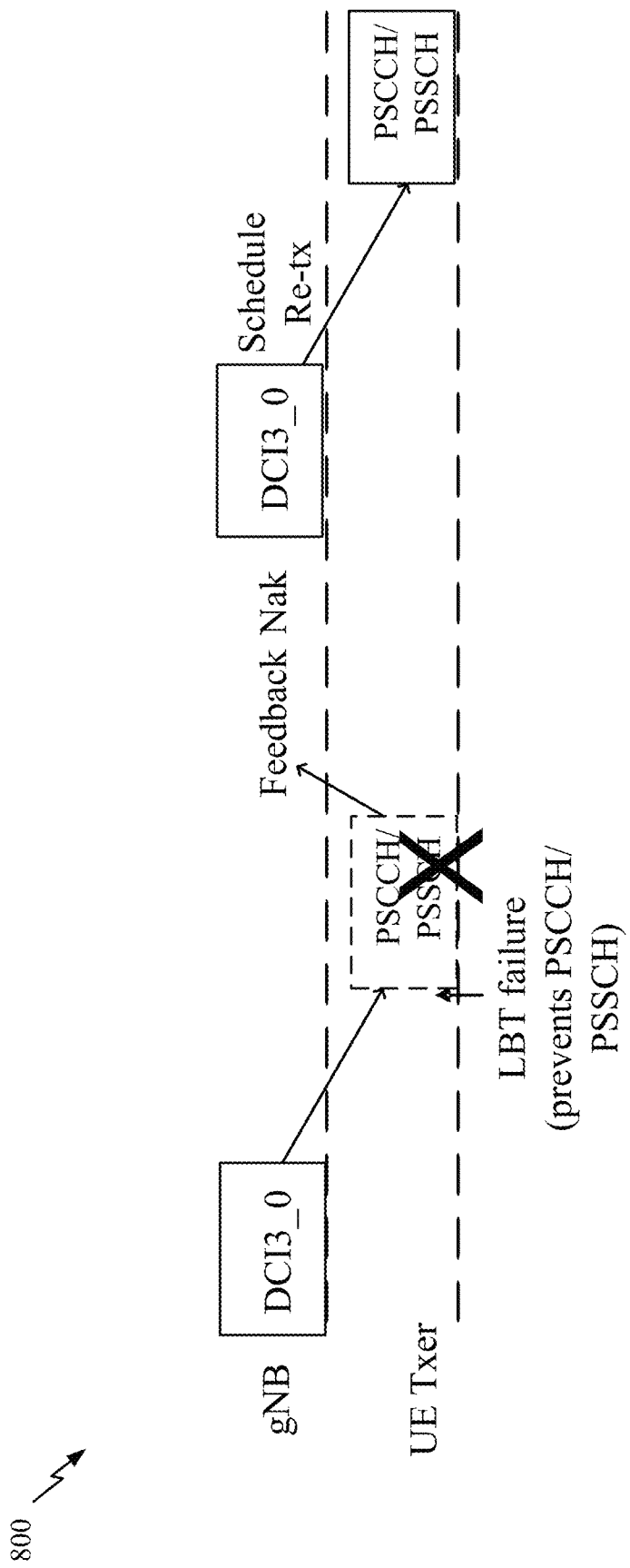
FIG. 8 illustrates an example listen before talk (LBT) scenario for sidelink communications.

As noted above, when operating in Mode 1 with gNB allocating resources in an unlicensed spectrum is that the transmitter UE still has to perform an LBT procedure before transmitting. This scenario is illustrated in FIG. 8, in which a gNB sends a grant to a transmitter UE for a single SL transmission, via a DCI. The transmitter UE performs an LBT to ensure the channel is free before sending the SL transmission. As illustrated, in the event of failure of the LBT procedure, it may send a negative acknowledgment (NAK) feedback to the gNB, indicating the transmitter UE may need an additional DCI grant from gNB, thus resulting in additional control signal overhead and extra delay.

In some cases, a gNB may assign orthogonal resources via a DCI format 3_0, for sidelink transmissions. The DCI format 3_0 may specify a starting subchannel, the number of subchannels, and the slot for the transmitter UE to transmit. The gNB may make sure that the resource allocations for different transmitter UEs are orthogonal. Otherwise, as noted above, failures transmitter UEs to clear LBT may require additional DCI grants.

Figure 9:
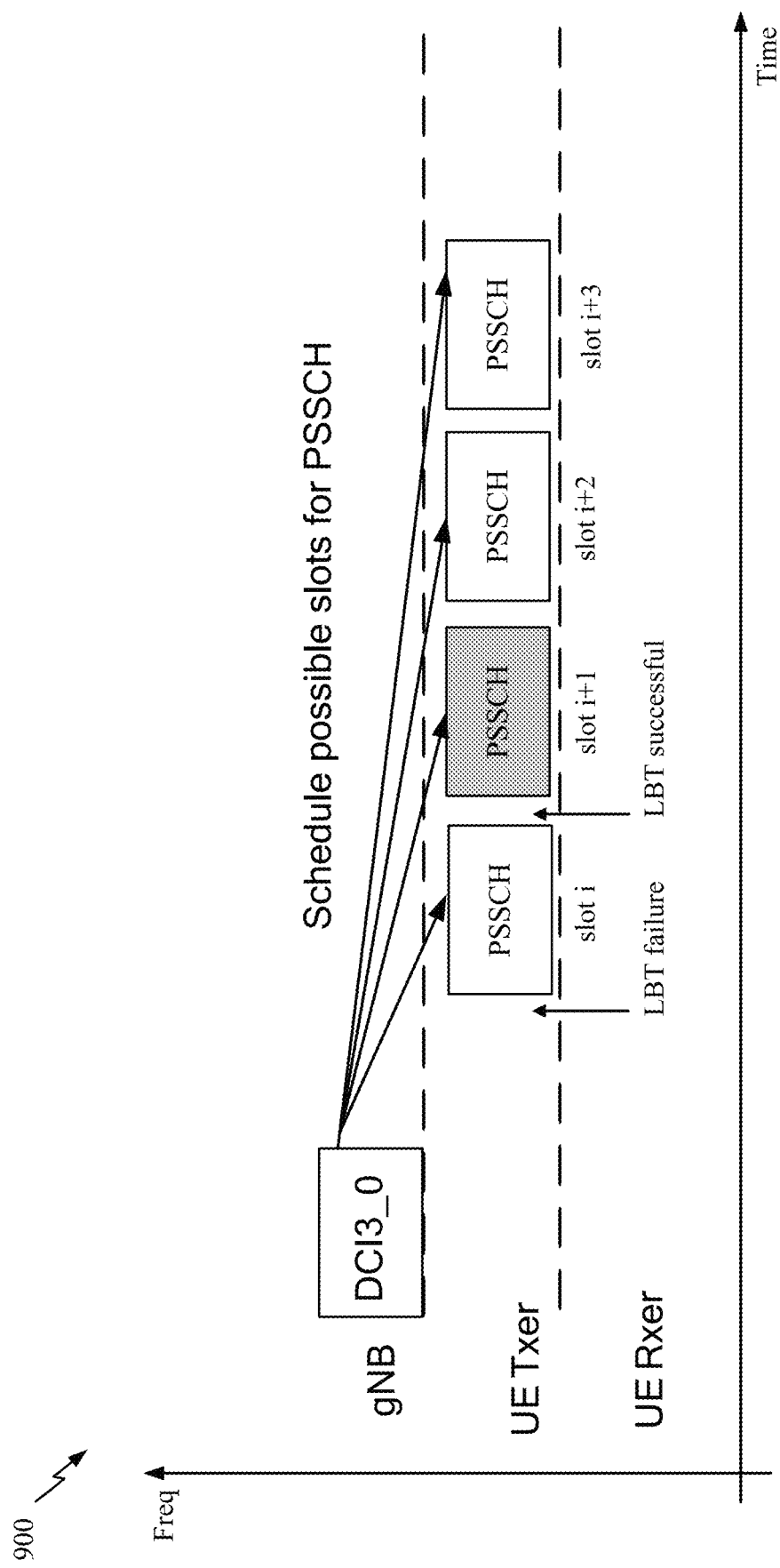
FIG. 9 illustrates an example timeline for a grant scheduling multiple sidelink transmissions, in accordance with certain aspects of the present disclosure.

In some cases, as illustrated in FIG. 9, a multi-opportunity grant for mode 1 resource allocation (RA) may be used to schedule multiple slot opportunities for a transmitter UE to clear LBT. As shown, the DCI may be a DCI format DCI3_0 that indicates time and frequency resources for sidelink transmissions in multiple slots. In the illustrated example, resources are allocated for four PSSCH transmissions in consecutive slots (slots i through i+3). In some cases, a single DCI (DCI3_0) may include a multi-transmission time interval (multi-TTI) grant for PSCCH/PSSCH in continuous slots within a pool (TX pool) of resources available for sidelink transmissions. This DCI effectively convey a single grant and indicates a time domain resource allocation (TDRA) for multiple transport blocks (TBs).

In addition to the multi-opportunity grant for mode 1 above for scheduling multiple slot opportunities to clear LBT, the present disclosure may make use of NR-U uplink parameters, such as cyclic prefix (CP) extension with different starting points for dynamically scheduling PUSCH. In NR-U uplink, the CP extension may be located in the symbol(s) immediately preceding the PUSCH allocation indicated by start and length indicator value (SLIV) for time domain allocation. For example, the supported durations for CP extension at the UE may include:

0 (i.e. no CP extension);
C1*symbol length—25 µs;
C2*symbol length—16 µs—TA (timing advance); or
C3*symbol length—25 µs—TA;

where C1=1 for 15 and 30 kHz subcarrier spacings (SCS) and C1=2 for 60 kHz SCS, while C2 and C3 may be UE specifically RRC configured. In some cases, the CP extension may leave no gap or may leave a 16 us gap, which may allow the UE to follow a prior transmission with Category 1 (CAT 1) LBT. A 16 µs or 25 µs gap may allow the UE to join a channel occupancy time (COT) with CAT 2 LBT. As will be described herein, assigning starting positions may be useful for frequency division multiplexing UEs. In some cases, in NR-U, LBT type, length of the CP extension, and channel access priority class (CAPC) may be jointly encoded in the UL grant.

One potential issue with the multi-opportunity grant is that the allocated resources may be under-utilized, for example, if the UE only transmits on a subset of the slots and not allowing other UEs to use the remaining available slots. For a scheduled subchannel, the network (e.g., gNB) may not know on which subset of the scheduled slots the UE is able to clear the channel access procedure. As shown in FIG. 9, when the LBT of the UE Txer is successful at slot i+1, other UEs may not use the remaining possible slots for PSSCH, resulting under-utilized resources.

Aspects of the present disclosure may help better utilize system resources, by assigning multiple starting positions to different UEs multiplexed in a multi-opportunity grant.

Example TX UE Multiplexing in Multi-Opportunity Grant and Channel Access Parameters in New Radio Unlicensed Spectrum Aspects of the present disclosure provide techniques for multiplexing multiple sidelink transmitter user equipments (UEs) in multiple opportunities scheduled by a single grant, by including a starting position. In other words, for any given slot, each transmitter UE may be assigned a different starting position. As will be described in greater detail below, different transmitter UEs may be assigned different starting positions within any given slot. In some cases, the starting positions assigned the multiple transmitter UEs may hop (may change each slot according to a hopping pattern) to avoid a scenario where a given transmitter UE assigned with an earlier starting position blocks the rest of the transmitter UEs.

FIG. 10 is a flow diagram illustrating example operations 1000 for wireless communication. The operations 1000 may be performed, for example, by a network entity (e.g., such as the BS 102 in the wireless communication network 100 of FIG. 1). The operations 1000 may be implemented as software components that are executed and run on one or more processors (e.g., the controller/processor 240 of FIG. 2). Further, transmission and reception of signals by the network entity in operations 1000 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 1000 begin, at 1002, by transmitting, to at least a first UE, at least one downlink control information (DCI) scheduling multiple slots where the first UE has multiple opportunities to transmit a physical sidelink shared channel (PSSCH) subject to a channel access procedure. For example, the network entity may transmit the signaling using antenna(s) and transmitter/transceiver components of the BS 102 shown in FIG. 1 or FIG. 2 and/or of the apparatus shown in FIG. 14.

At 1004, the network entity assigns the first UE at least one first starting position within the multiple slots for the first UE to perform the channel access procedure. For example, the network entity may send the signaling using antenna(s) and transmitter/transceiver components of the BS 102 shown in FIG. 1 or FIG. 2 and/or of the apparatus shown in FIG. 14.

Figure 11:
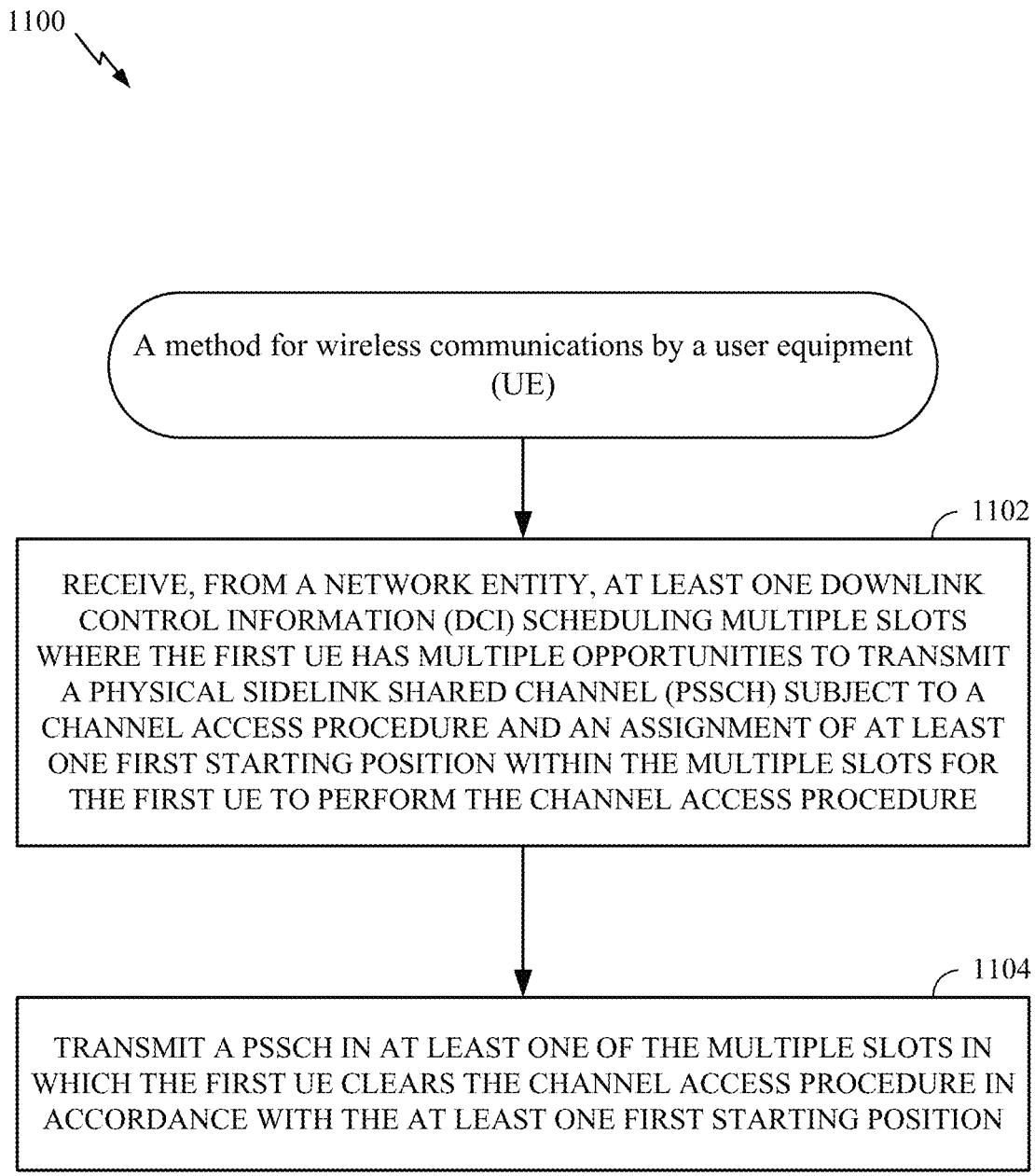
FIG. 11 depicts a flow diagram illustrating example operations for wireless communication by a UE, in accordance with certain aspects of the present disclosure.

FIG. 11 depicts a flow diagram illustrating example operations 1100 for wireless communication. The operations 1100 may be performed, for example, by a UE (e.g., the UE 104 in the wireless communication network 100 of FIG. 1). The operations 1100 may be implemented as software components that are executed and run on one or more processors (e.g., the controller/processor 280 of FIG. 2). Further, transmission and reception of signals by the UE in operations 1100 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 1100 begin, at 1102, by receiving, from a network entity, at least one DCI scheduling multiple slots where the first UE has multiple opportunities to transmit a PSSCH subject to a channel access procedure and an assignment of at least one first starting position within the multiple slots for the first UE to perform the channel access procedure. For example, the UE may receive the signaling using antenna(s) and transmitter/transceiver components of the UE 104 shown in FIG. 1 or FIG. 2 and/or of the apparatus shown in FIG. 15. At 1104, the UE transmits a PSSCH in at least one of the multiple slots in which the first UE clears the channel access procedure in accordance with the at least one first starting position.

Figure 12:
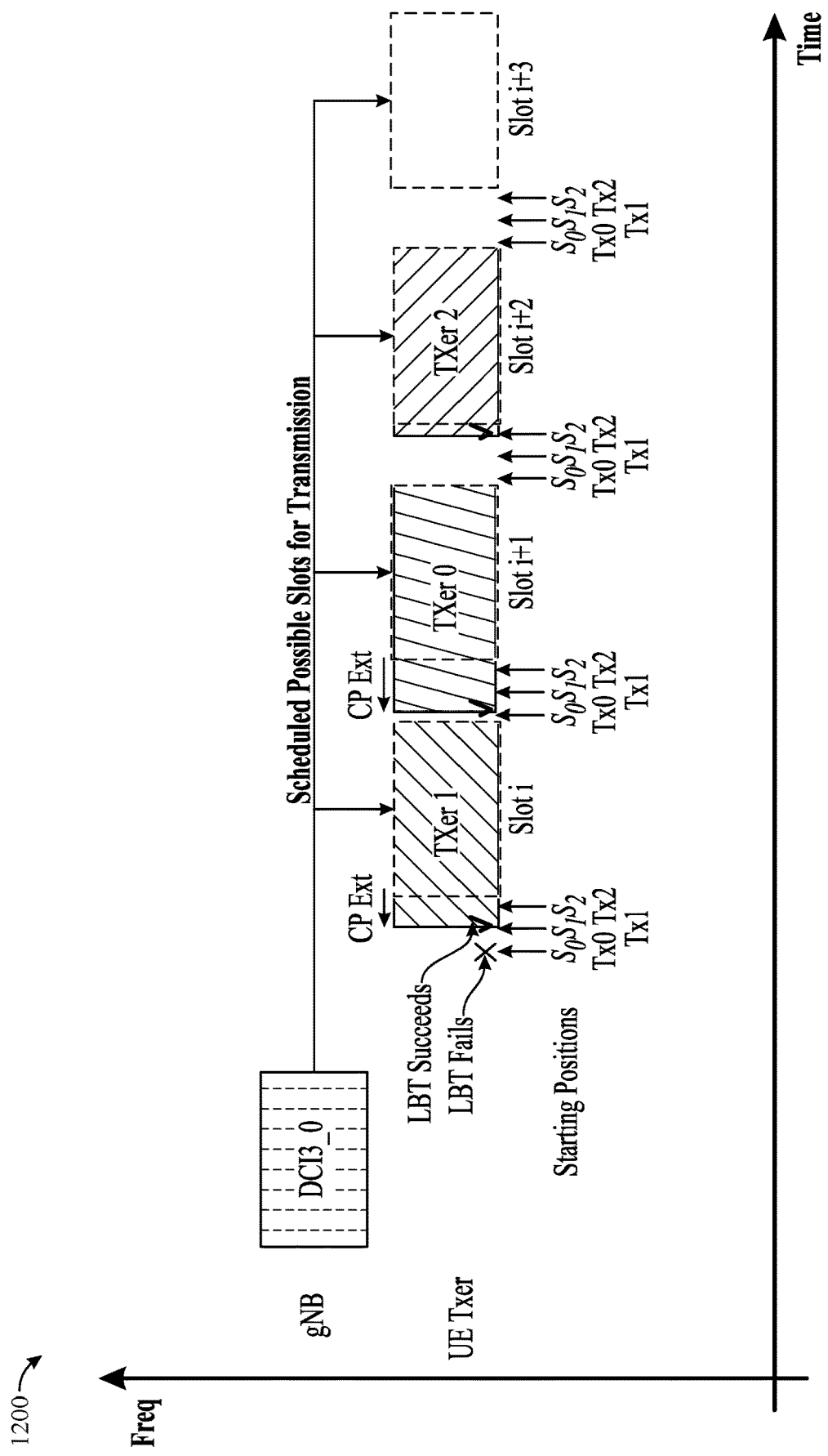
FIG. 12 depicts an example timeline illustrating multi-opportunity grant with multiple UEs, in accordance with certain aspects of the present disclosure.
Figure 13:
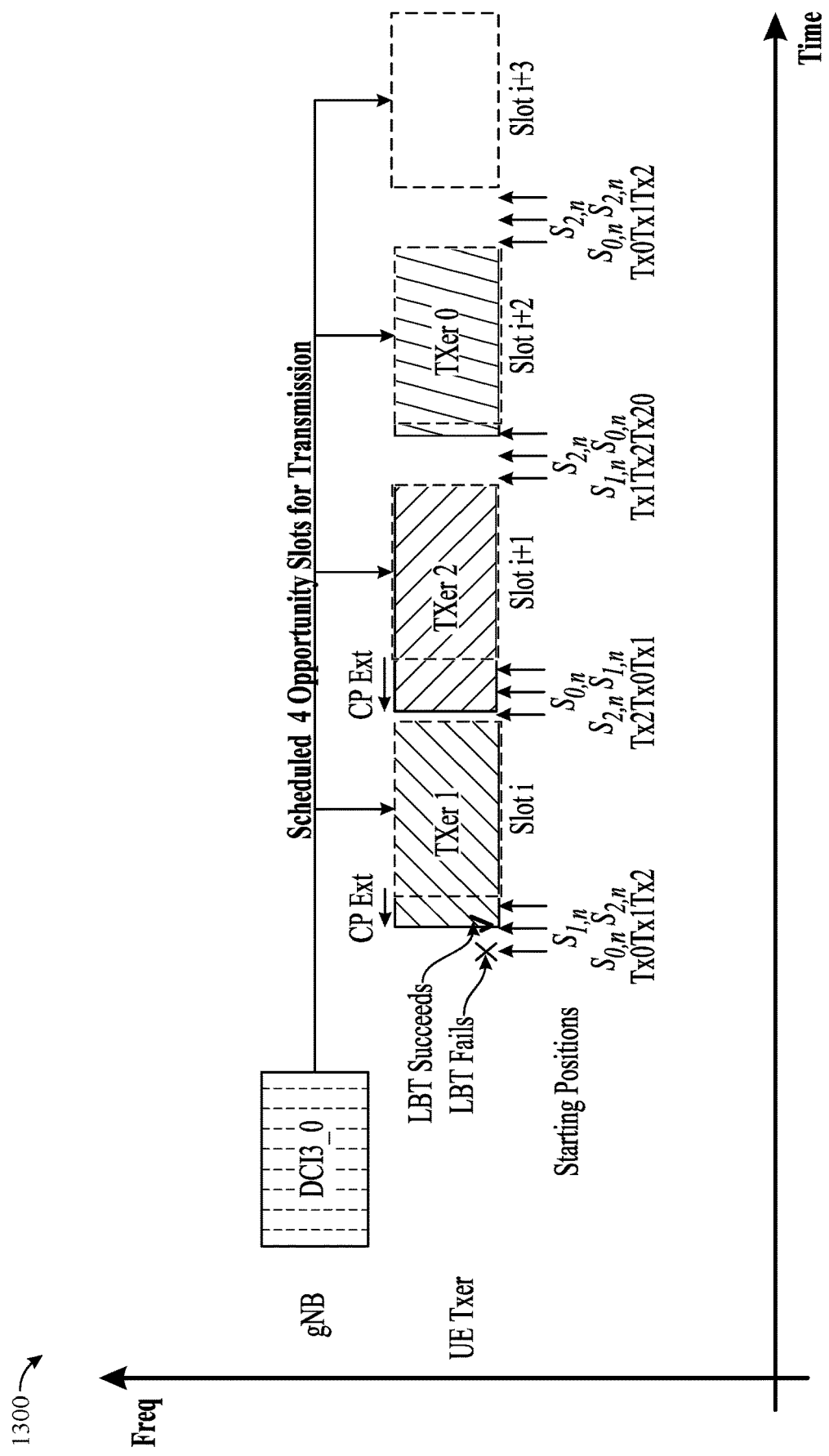
FIG. 13 depicts an example timeline illustrating starting position hopping with multiple UEs, in accordance with certain aspects of the present disclosure.

The operations 1000 and 1100 of FIGS. 10 and 11 may be further understood within reference to FIGS. 12-13, which depicts timelines illustrating multi-opportunity grant with multiple UEs (i.e., TXer0, TXer 1, and TXer 2).

As shown in FIG. 12, the DCI schedules multiple possible slots for transmission and indicate starting positions ($s_0$, $s_1$, or $s_2$) in each slot for each of the transmitter (TXer) UEs. The DCI. In this manner, the gNB may multiplex TXer 0, TXer 1, and TXer 2) in the set of slots allocated by a single grant.

The multiple UEs may be separated and experience different interference, thus not all may clear the channel access procedure as scheduled. In the example shown in FIG. 12, TXer 0 fails in clearing the LBT at so but TXer 1 succeeds in clearing LBT at $s_1$ and is able to transmit in slot i. TXer 0 is able to pass LBT in slot i+1, while TXer 2 passes LBT in slot i+2. Thus, when compared to the example shown in FIG. 9, the multiplexing approach proposed herein results in better resource utilization.

In certain aspects, a new field indicating a starting position may be introduced to the DCI format 3_0. The UEs (e.g., TXer 0, TXer 1, and TXer 2) may be treated as responding devices for gNB's grant. In some cases, when the UEs are within the channel occupancy time (COT) of the gNB, only categories (CAT) 1 or 2 of LBT may be needed. In some cases, an LBT gap may be created at the beginning of each slot or in the last few symbols of a previous slot to allow for LBT sensing. As shown respectively at $s_1$ for TXer 1 at slot i, so for TXer 0 at slot i+1, and $\Omega$ for TXer 2 at slot i+2, when each UE succeeds in completing the LBT procedure, a cyclic prefix (CP) extension (CP ext) may be added toward the indicated starting position.

In certain aspects, the at least one DCI schedules a second UE (e.g., TXer 1) with at least some of the multiple slots where the second UE also has multiple opportunities to transmit a PSSCH subject to the LBT procedure (or other channel access procedures). The network entity assigns the second UE at least one second starting position within the multiple slots for the second UE to perform the channel access procedure. For example, the gNB may transmit at least a first DCI to the first UE (e.g., TXer 0), and transmit a second DCI to the second UE (e.g., TXer 1).

As shown, the gNB of FIG. 12 schedules multiple UEs (e.g., TXer 0, TXer 1, and TXer 2) within the same or overlapping set of transmission time intervals (TTIs) and with different starting positions in the sidelink DCI. That is, gNB may multiplex the UEs with different starting positions for the different UEs in the sidelink network. Each UE is assigned with different starting positions (e.g., $s_0$, $s_1$, and $s_2$). The UEs may add respective CP extensions toward the indicated starting positions.

By assigning different starting positions to the UEs, slot assignments between the UEs may thus be orthogonalized, assuming they are able to detect each other's transmissions (hear each other).

As indicated above, in some cases, the UE that has an earliest starting position than others may block other UEs from taking the corresponding slot in a given subchannel. In the example shown in FIG. 12, TXer 2 is blocked by TXer 1 in slot i. In some cases, only one UE may be transmitting for a given slot in a given subchannel. The UEs having later starting positions may clear the LBT and transmit in the corresponding slot if the earlier UE fails to complete the LBT procedure or empty the buffer to transmit in the slot. For example, in FIG. 12, TXer 1 clears LBT in slot i even though it is assigned a later starting position ($s_1$) than TXer 0, since TXer 0 failed the LBT.

In this example, TXer 0, TXer 1, and TXer 2 are assigned with the same four slots for selective transmission. The UEs are respectively assigned with starting position $s_0$, $s_1$, and $s_2$. Assuming the UEs all have one transport block (TB) to transmit. In slot i, because TXer 0 fails the LBT and the subsequent TXer 1 clears the LBT, TXer 1 may thus proceed with transmitting the TB of TXer 1 via PSSCH. In the slot i+1, as TXer 0 clear the LBT, TXer 0 may proceed with transmitting. In slot i+2, only Txer2 has TB to transmit and it may go ahead clear the LBT and transmit. In some cases, even though TXer 0 fails the LBT at the first slot, it may continue to try in later slots with the same grant. In this manner, the LBT delay may be minimized (as the need for an additional DCI may be avoided).

As noted above, according to certain aspects, starting position hopping across slots may be enabled. In the aforementioned examples, each UE is assigned with the same starting position for all the opportunity slots. As such, UEs assigned with a later starting position may more likely be blocked by another UE or interferer. In some cases, assigning some UEs with later starting positions to multiplex UE in a multi-opportunity grant may put the UEs that are more likely blocked at inferior positions for clearing LBT or similar channel access procedures, even when the UEs having earlier starting positions have already finished transmission, or have no data to transmit. To overcome such inefficiency, the starting position assignments may be varied (or hopped) among the UEs in sidelink connections.

FIG. 13 depicts an example timeline 1300 illustrating starting position hopping with multiple UEs, in accordance with certain aspects of the present disclosure. A hopping pattern may be defined among a predefined set of starting positions. The gNB may signal or the UEs may follow the hopping pattern (or pattern index) in the multi-opportunity grant. As shown, the starting position hopping patterns are defined as $s_{i,n}$ within a predefined set of starting positions. In the definition, i represents the hopping pattern index, while n represents the relative slot index with respect to the first opportunity scheduled.

In the example illustrated in FIG. 13, the hopping pattern results in assignment of the first starting position in slot i ($s_{0,n}$) to TXer 1, assignment of the first starting position in slot i+1 ($s_{2,n}$) to TXer 2, assignment of the first starting position in slot i+2 ($s_{1,n}$) to TXer 1, and assignment of the first starting position in slot i+3 ($s_{0,n}$) again to TXer 0.

In the DCI grant, each UE is assigned with a hopping pattern $s_{i,n}$. In some cases, the hopping pattern may be orthogonal. As illustrated, the UEs may follow the assigned pattern $s_{i,n}$ as indicated in the grant and start transmission at the $s_{i,n}$ when successfully clearing the channel access procedure (e.g., an LBT procedure). Respective CP extension may be assumed before the next symbol boundary.

Using the hopping pattern, from a UE's perspective, the UE has been assigned with time varying starting positions across multiple scheduled opportunity slots. As such, at the slot with an earlier starting position than another UE, the UE has a higher priority to clear LBT. Conversely, at the slot with a later starting position than another UE, the UE has lower priority to clear LBT. In the example 1200 of FIG. 12, TXer 0 always has a higher LBT priority among the scheduled UEs, because the starting position of TXer 0 is the earliest throughout the scheduled slots. By comparison, in the example 1300 of FIG. 13, the UEs permute their starting positions in different slots so that the UEs take turns to have highest priority in different slots. This way, inefficiency in clearing LBT procedures may be avoided or minimized.

In certain aspects, starting positions for multiple TBs may be assigned or scheduled. As discussed earlier, for multi-opportunity grants, a network entity may schedule UEs to transmit more than one contiguous slots within the scheduled opportunity slots. Often, the transmission of multiple TBs is supposed to be back-to-back with no more than 16 μs gap. Otherwise, the UEs may not continue transmission with CAT 1 or 2 LBT when using the same shared COT. The example 1200 of FIG. 12 may have a gap greater than 16 μs.

In order to avoid such possible conflict, for the US with more than one TB, the UE may override the starting positions after the first transmission, so that the gap between TBs can stay within 16 μs. For example, starting from the second TB, the UE may continue the transmission in the subsequent slots without leaving any LBT gap. Such scheme may block any FDM UEs starting in the middle of the transmission burst if the FDM UEs' starting positions have a gap great than 16 μs. In some cases, the network entity may assign starting positions that leave various gaps, including: no gap, or 16 or 25 μs gap to support CAT 1/2 LBT procedures. For a multi-opportunity grant, these starting positions may be additional to the later starting position used for the UE's multiplexing as aforementioned.

In certain aspects, starting positions may be selected to allow a gap of a predetermined length for channel access between slots. For example, the network entity may assign a general starting position among multi-slot and single slot grants. For example, the starting positions may allow no gap, a 16 μs gap, or a 25 μs gap. For the case of LBT gap located in the front of the slot, NR uplink starting positions may be reused, along with the CP extension durations, which include the following:

0 (i.e., no CP extension)
C1*symbol length—25 us
C2*symbol length—16 us—TA; and
C3*symbol length—25 us—TA For cases having LBT gaps located in the last few symbols of the slot, the CP extension duration may be:

C0*symbol length (i.e., no CP extension)
C1*symbol length—25 us
C2*symbol length—16 us—TA
C3*symbol length—25 us—TA In some cases, C0 may be the same as C1, depending on subcarrier spacing (SCS).

In certain aspects, the DCI may also indicate at least one of a channel access type or channel access priority class (CAPC). For example, the DCI may also include an LBT type (CAT 1, 2, or 4). The gNB may schedule the UEs CAT 1 or 2 or CAT 4 depending on the scheduled slots inside or outside the shared COT. In some cases, the gNB may signal the CAPC that is used for CAT 4 LBT to initiate the original COT. The gNB may propagate the shared COT from one UE to another UE and the COT initiating device may start the COT with any CAPC value. In some cases, the gNB may acquire the COT with the lowest CAPC value. As such, there may be no COT propagation more than one hop.

In certain aspects, an LBT type change with shared channel occupancy (COT) awareness with other (SL) UEs may be allowed. For example, the LBT type change may be allowed when a first UE is detecting other SL UEs shared COT. For example, the first UE may initially be indicated to use CAT 4 LBT. Upon detection of other SL UE's shared COT, for example in COT system information (COT-SI), the first UE may change the LBT type.

Example Wireless Communication Devices

Figure 14:
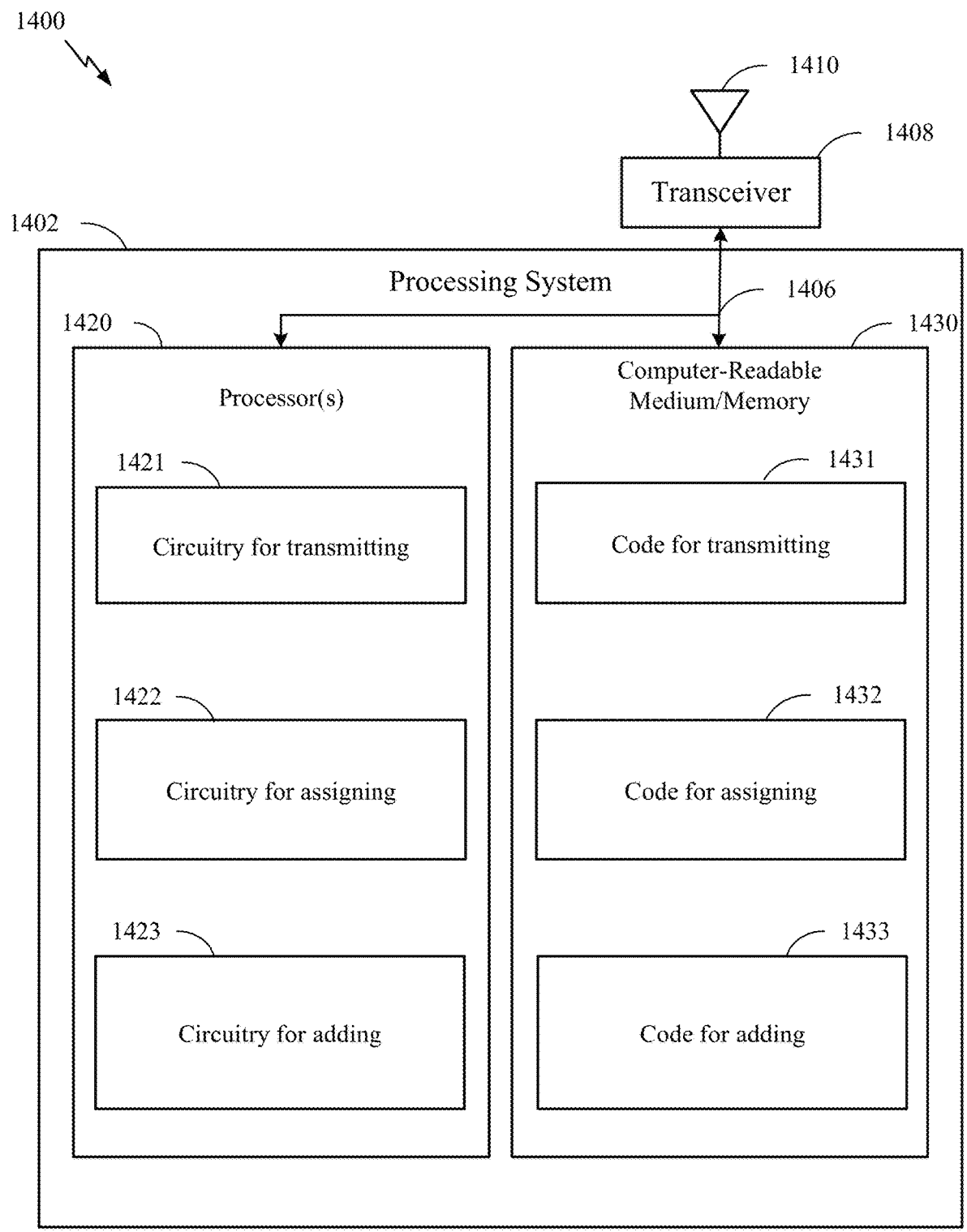
FIGS. 14 and 15 depict example wireless communications devices configured to perform operations for the methods disclosed herein, in accordance with certain aspects of the present disclosure.

FIG. 14 depicts an example communications device 1400 that includes various components operable, configured, or adapted to perform operations for the techniques disclosed herein, such as the operations depicted and described with respect to FIG. 10. In some examples, communication device 1400 may be a base station (BS) 102 as described, for example with respect to FIGS. 1 and 2.

Communications device 1400 includes a processing system 1402 coupled to a transceiver 1408 (e.g., a transmitter and/or a receiver). Transceiver 1408 is configured to transmit (or send) and receive signals for the communications device 1400 via an antenna 1410, such as the various signals as described herein. Processing system 1402 may be configured to perform processing functions for communications device 1400, including processing signals received and/or to be transmitted by communications device 1400.

Processing system 1402 includes one or more processors 1420 coupled to a computer-readable medium/memory 1420 via a bus 1406. In certain aspects, computer-readable medium/memory 1420 is configured to store instructions (e.g., computer-executable code) that when executed by the one or more processors 1420, cause the one or more processors 1420 to perform the operations illustrated in FIG. 10, or other operations for performing the various techniques discussed herein.

In the depicted example, computer-readable medium/ memory 1430 stores code 1431 for transmitting, code 1432 for assigning, and code 1433 for adding.

In certain aspects, the code 1431 for transmitting includes code for transmitting, to at least a first user equipment (UE), at least one downlink control information (DCI) scheduling multiple slots where the first UE has multiple opportunities to transmit a physical sidelink shared channel (PSSCH) subject to a channel access procedure, and/or code for transmitting a sidelink downlink control channel (DCI).

In certain aspects, the code 1432 for assigning includes code for assigning the first UE at least one first starting position within the multiple slots for the first UE to perform the channel access procedure, and/or code for assigning the second UE at least one second starting position within the multiple slots for the second UE to perform the channel access procedure.

In certain aspects, the code 1433 for adding includes code for adding different CP extensions for the first and the second UEs based on the first and the second starting positions.

In the depicted example, the one or more processors 1420 include circuitry configured to implement the code stored in the computer-readable medium/memory 1420, including circuitry 1421 for transmitting, circuitry 1422 for assigning, and circuitry 1423 for adding.

In certain aspects, the circuitry 1421 for transmitting includes circuitry for for transmitting, to at least a first UE, at least one downlink control information (DCI) scheduling multiple slots where the first UE has multiple opportunities to transmit a physical sidelink shared channel (PSSCH) subject to a channel access procedure, and/or circuitry for transmitting a sidelink downlink control channel (DCI).

In certain aspects, the circuitry 1422 for assigning includes circuitry for assigning the first UE at least one first starting position within the multiple slots for the first UE to perform the channel access procedure, and/or circuitry for assigning the second UE at least one second starting position within the multiple slots for the second UE to perform the channel access procedure.

In certain aspects, the circuitry 1423 for adding includes circuitry for adding different CP extensions for the first and the second UEs based on the first and the second starting positions.

Various components of communications device 1400 may provide means for performing the methods described herein, including with respect to FIG. 10.

In some examples, means for transmitting or sending (or means for outputting for transmission) may include the transceivers 232 and/or antenna(s) 234 of the BS 102 illustrated in FIG. 2 and/or transceiver 1408 and antenna 1410 of the communication device 1400 in FIG. 14.

In some examples, means for receiving (or means for obtaining) may include the transceivers 232 and/or antenna(s) 234 of the BS 102 illustrated in FIG. 2 and/or transceiver 1408 and antenna 1410 of the communication device 1400 in FIG. 14.

In some examples, means for transmitting, to at least a first UE, at least one DCI scheduling multiple slots where the first UE has multiple opportunities to transmit a PSSCH subject to a channel access procedure, means for assigning the first UE at least one first starting position within the multiple slots for the first UE to perform the channel access procedure, means for assigning the second UE at least one second starting position within the multiple slots for the second UE to perform the channel access procedure, and/or means for adding different CP extensions for the first and the second UEs based on the first and the second starting positions may include various processing system components, such as: the one or more processors 1420 in FIG. 20, or aspects of the user equipment 104 depicted in FIG. 2, including receive processor 258, transmit processor 264, TX MIMO processor 266, and/or controller/processor 280 (including the starting position manager 281).

Notably, FIG. 14 is just use example, and many other examples and configurations of communication device 1400 are possible.

Figure 15:
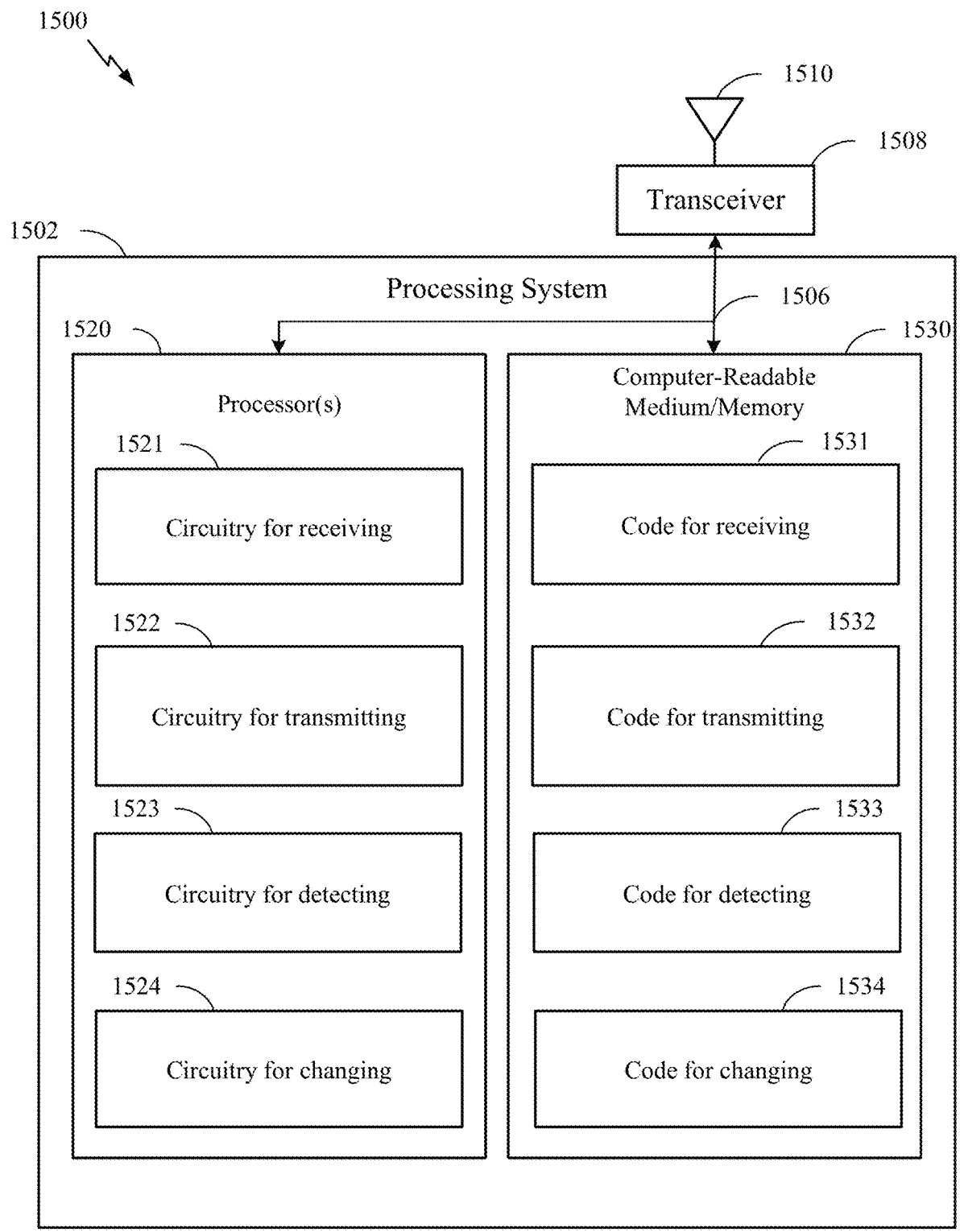

FIG. 15 depicts an example communications device 1500 that includes various components operable, configured, or adapted to perform operations for the techniques disclosed herein, such as the operations depicted and described with respect to FIG. 11. In some examples, communication device 1500 may be a base station (BS) 102 as described, for example with respect to FIGS. 1 and 2.

Communications device 1500 includes a processing system 1502 coupled to a transceiver 1508 (e.g., a transmitter and/or a receiver). Transceiver 1508 is configured to transmit (or send) and receive signals for the communications device 1500 via an antenna 1510, such as the various signals as described herein. Processing system 1502 may be configured to perform processing functions for communications device 1500, including processing signals received and/or to be transmitted by communications device 1500.

Processing system 1502 includes one or more processors 1520 coupled to a computer-readable medium/memory 1520 via a bus 1506. In certain aspects, computer-readable medium/memory 1520 is configured to store instructions (e.g., computer-executable code) that when executed by the one or more processors 1520, cause the one or more processors 1520 to perform the operations illustrated in FIG. 11, or other operations for performing the various techniques discussed herein.

In the depicted example, computer-readable medium/memory 1530 stores code 1531 for receiving, code 1532 for transmitting, code 1533 for detecting, and code 1534 for changing.

In some cases, the code 1531 for receiving may include code for receiving, from a network entity, at least one DCI scheduling multiple slots where the first UE has multiple opportunities to transmit a PSSCH subject to a channel access procedure and an assignment of at least one first starting position within the multiple slots for the first UE to perform the channel access procedure.

In some cases, the code 1532 for transmitting may include code for transmitting a PSSCH in at least one of the multiple slots in which the first UE clears the channel access procedure in accordance with the at least one first starting position, code for transmitting a first transport block (TB) in a first PSSCH in a first slot of the multiple slots in which the first UE clears the channel access procedure in accordance with the at least one first starting position, and/or code for transmitting a second TB in a second PSSCH in a subsequent slot of the multiple slots without regard to the first starting position assigned to the first UE for that slot.

In some cases, the code 1533 for detecting may include code for detecting at least a second UE shares a channel occupancy time (COT) with the first UE.

In some cases, the code 1534 for changing may include code for changing a type of the channel access procedure in response to the detection.

In the depicted example, the one or more processors 1520 include circuitry configured to implement the code stored in the computer-readable medium/memory 1520, including circuitry 1521 for receiving and circuitry 1522 for transmitting, circuitry 1523 for detecting, and circuitry 1524 for changing.

In some cases, the circuitry 1521 for receiving may include circuitry for receiving, from a network entity, at least one DCI scheduling multiple slots where the first UE has multiple opportunities to transmit a PSSCH subject to a channel access procedure and an assignment of at least one first starting position within the multiple slots for the first UE to perform the channel access procedure.

In some cases, the circuitry 1522 for transmitting may include circuitry for transmitting a PSSCH in at least one of the multiple slots in which the first UE clears the channel access procedure in accordance with the at least one first starting position, circuitry for transmitting a first TB in a first PSSCH in a first slot of the multiple slots in which the first UE clears the channel access procedure in accordance with the at least one first starting position, and/or circuitry for transmitting a second TB in a second PSSCH in a subsequent slot of the multiple slots without regard to the first starting position assigned to the first UE for that slot.

In some cases, the circuitry 1523 for detecting may include circuitry for detecting at least a second UE shares a COT with the first UE.

In some cases, the circuitry 1524 for changing may include circuitry for changing a type of the channel access procedure in response to the detection.

Various components of communications device 1500 may provide means for performing the methods described herein, including with respect to FIG. 11.

In some examples, means for transmitting or sending (or means for outputting for transmission) may include the transceivers 254 and/or antenna(s) 252 of the UE 104 illustrated in FIG. 2 and/or transceiver 1508 and antenna 1510 of the communication device 1500 in FIG. 15.

In some examples, means for receiving (or means for obtaining) may include the transceivers 254 and/or antenna(s) 252 of the UE 104 illustrated in FIG. 2 and/or transceiver 1508 and antenna 1510 of the communication device 1500 in FIG. 15.

In some examples, means for receiving from a network entity, at least one DCI scheduling multiple slots where the first UE has multiple opportunities to transmit a PSSCH subject to a channel access procedure and an assignment of at least one first starting position within the multiple slots for the first UE to perform the channel access procedure, means for transmitting a PSSCH in at least one of the multiple slots in which the first UE clears the channel access procedure in accordance with the at least one first starting position, means for transmitting a first transport block (TB) in a first PSSCH in a first slot of the multiple slots in which the first UE clears the channel access procedure in accordance with the at least one first starting position; means for transmitting a second TB in a second PSSCH in a subsequent slot of the multiple slots without regard to the first starting position assigned to the first UE for that slot, means for detecting at least a second UE shares a COT with the first UE and/or means for changing a type of the channel access procedure in response to the detection may include various processing system components, such as: the one or more processors 1520 in FIG. 15, or aspects of the BS 102 depicted in FIG. 2, including receive processor 238, transmit processor 220, TX MIMO processor 230, and/or controller/processor 240 (including the starting position manager 241).

Notably, FIG. 15 is just use example, and many other examples and configurations of communication device 1500 are possible.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmW), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with core network 190 through second backhaul links 184. Base stations 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

Antennas 252, processors 266, 258, 264, and/or controller/processor 280 of UE 104 and/or antennas 234, processors 220, 230, 238, and/or controller/processor 240 of BS 102 may be used to perform the various techniques and methods described herein.

For example, as shown in FIG. 2, the controller/processor 240 of the BS 102 has the starting position manager 241 that may be configured to perform the operations shown in FIG. 10, as well as other operations described herein for providing power control parameters for channels and/or reference signals sharing a same common TCI state. As shown in FIG. 2, the controller/processor 280 of the UE 104 has a starting position manager 281 that may be configured to perform the operations shown in FIG. 11, as well as other operations described herein for receiving power control parameters for channels and/or reference signals sharing a same common TCI state. Although shown at the controller/processor, other components of UE 104 and BS 102 may be used to perform the operations described herein.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Aspects

Aspect 1: A method for wireless communications by a network entity, comprising: transmitting, to at least a first user equipment (UE), at least one downlink control information (DCI) scheduling multiple slots where the first UE has multiple opportunities to transmit a physical sidelink shared channel (PSSCH) subject to a channel access procedure; and assigning the first UE at least one first starting position within the multiple slots for the first UE to perform the channel access procedure.

Aspect 2: The method of Aspect 1, wherein: the at least one first starting position is indicated via the at least one DCI.

Aspect 3: The method of Aspect 1 or 2, wherein the at least one DCI further indicates one or more parameters associated with the channel access procedure.

Aspect 4: The method of any one of Aspects 1 to 3, wherein the channel access procedure comprises a listen-before-talk (LBT) procedure.

Aspect 5: The method of any one of Aspects 1 to 4, wherein the DCI comprises a field indicating the first starting position.

Aspect 6: The method of any one of Aspects 1 to 5, wherein: the at least one DCI schedules a second UE with at least some of the multiple slots where the second UE also has multiple opportunities to transmit a PSSCH subject to the channel access procedure; and the method further comprises assigning the second UE at least one second starting position within the multiple slots for the second UE to perform the channel access procedure.

Aspect 7: The method of Aspect 6, wherein the at least one DCI comprises at least a first DCI transmitted to the first UE and a second DCI transmitted to the second UE.

Aspect 8: The method of Aspect 6 or 7, wherein the first starting position and the second starting positions are different.

Aspect 9: The method of any one of Aspects 6 to 8, further comprising adding different CP extensions for the first and the second UEs based on the first and the second starting positions.

Aspect 10: The method of any one of Aspects 6 to 9, wherein: the at least one first starting position comprises a sequence of first starting positions, wherein the first starting position within each of the multiple slots is determined by a first hopping pattern; and the at least one second starting position comprises a sequence of second starting positions, wherein the second starting position within each of the multiple slots is determined by a second hopping pattern.

Aspect 11: The method of Aspect 10, wherein the first and second hopping patterns are indicated via first and second pattern indexes.

Aspect 12: The method of Aspect 6, wherein the at least one first and at least one second starting positions are selected to allow a gap of a predetermined length for channel access between slots.

Aspect 13: The method of Aspect 1, wherein the DCI also indicates at least one of a channel access type or channel access priority class (CAPC).

Aspect 14: A method for wireless communications by a first user equipment (UE), comprising: receiving, from a network entity, at least one downlink control information (DCI) scheduling multiple slots where the first UE has multiple opportunities to transmit a physical sidelink shared channel (PSSCH) subject to a channel access procedure and an assignment of at least one first starting position within the multiple slots for the first UE to perform the channel access procedure; and transmitting a PSSCH in at least one of the multiple slots in which the first UE clears the channel access procedure in accordance with the at least one first starting position.

Aspect 15: The method of Aspect 14, wherein: the at least one first starting position is indicated via the at least one DCI.

Aspect 16: The method of Aspect 14 or 15, wherein the at least one DCI further indicates one or more parameters associated with the channel access procedure.

Aspect 17: The method of any one of Aspects 14 to 16, wherein the channel access procedure comprises a listen-before-talk (LBT) procedure.

Aspect 18: The method of any one of Aspects 14 to 17, wherein the DCI comprises a field indicating the first starting position.

Aspect 19: The method of any one of Aspects 14 to 18, wherein: the at least one first starting position comprises a sequence of first starting positions, wherein the first starting position within each of the multiple slots is determined by a first hopping pattern.

Aspect 20: The method of Aspect 19, wherein the first hopping pattern is indicated via first and second pattern indexes.

Aspect 21: The method of any one of Aspects 14 to 20, wherein the transmitting comprises: transmitting a first transport block (TB) in a first PSSCH in a first slot of the multiple slots in which the first UE clears the channel access procedure in accordance with the at least one first starting position; and transmitting a second TB in a second PSSCH in a subsequent slot of the multiple slots without regard to the first starting position assigned to the first UE for that slot.

Aspect 22: The method of any one of Aspects 14 to 21, wherein: the DCI also indicates at least one of a channel access type or channel access priority class (CAPC); and the method comprises performing the channel access procedure in accordance with the at least one of channel access type or CAPC.

Aspect 23: The method of any one of Aspects 14 to 22, further comprising: detecting at least a second UE shares a channel occupancy time (COT) with the first UE; and changing a type of the channel access procedure in response to the detection.

Aspect 24: An apparatus for wireless communications by a first user equipment (UE), comprising: a memory; and at least one processor coupled to the memory, the at least one processor configured to: receive, from a network entity, at least one downlink control information (DCI) scheduling multiple slots where the first UE has multiple opportunities to transmit a physical sidelink shared channel (PSSCH) subject to a channel access procedure and an assignment of at least one first starting position within the multiple slots for the first UE to perform the channel access procedure; and transmit a PSSCH in at least one of the multiple slots in which the first UE clears the channel access procedure in accordance with the at least one first starting position.

Aspect 25: The apparatus of Aspect 24, wherein the at least one first starting position is indicated via the at least one DCI.

Aspect 26: The apparatus of Aspect 24 or 25, wherein the at least one DCI further indicates one or more parameters associated with the channel access procedure.

Aspect 27: The apparatus of any one of Aspects 24 to 26, wherein the at least one first starting position comprises a sequence of first starting positions, wherein the first starting position within each of the multiple slots is determined by a first hopping pattern.

Aspect 28: The apparatus of any one of Aspects 24 to 27, wherein the at least one processor is further configured to: transmit a first transport block (TB) in a first PSSCH in a first slot of the multiple slots in which the first UE clears the channel access procedure in accordance with the at least one first starting position; and transmit a second TB in a second PSSCH in a subsequent slot of the multiple slots without regard to the first starting position assigned to the first UE for that slot.

Aspect 29: The apparatus of any one of Aspects 24 to 28, wherein the at least one processor is further configured to: detect at least a second UE shares a channel occupancy time (COT) with the first UE; and change a type of the channel access procedure in response to the detection.

Aspect 30: A non-transitory computer readable medium storing instructions that when executed by a user equipment (UE) cause the UE to: receive, from a network entity, at least one downlink control information (DCI) scheduling multiple slots where the first UE has multiple opportunities to transmit a physical sidelink shared channel (PSSCH) subject to a channel access procedure and an assignment of at least one first starting position within the multiple slots for the first UE to perform the channel access procedure; and transmit a PSSCH in at least one of the multiple slots in which the first UE clears the channel access procedure in accordance with the at least one first starting position.

ADDITIONAL CONSIDERATIONS

The preceding description provides examples of power control parameters for uplink channels and/or reference signals sharing a same common TCI state in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor).

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 7, 8, 13, and 14, as well as other operations described herein for providing/receiving power control parameters for channels and/or reference signals sharing a same common TCI state.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated herein. Various modifications, changes and variations may be made in the arrangement, operation, and details of the methods and apparatus described herein.

What is claimed is:

1. A method for wireless communications by a network entity, comprising:
transmitting, to a first user equipment (UE), at least one downlink control information (DCI) scheduling multiple slots, wherein:
each of the multiple slots is an opportunity for the first UE to transmit in a physical sidelink shared channel (PSSCH); and
the at least one DCI indicates a first starting symbol position within each of the multiple slots for the first UE to perform a channel access procedure; and
transmitting, to a second UE, at least one DCI scheduling one or more slots of the multiple slots, wherein:
each of the one or more slots is an opportunity for the second UE to transmit a PSSCH; and
the at least one DCI indicates a second starting symbol position within each of the one or more slots for the second UE to perform the channel access procedure different than the first starting symbol position within the one or more slots for the first UE to perform the channel access procedure.

2. The method of claim 1, wherein the at least one DCI further indicates one or more parameters associated with the channel access procedure for the first UE and the at least one DCI further indicates one or more parameters associated with the channel access procedure for the second UE.

3. The method of claim 1, wherein the channel access procedure comprises a listen-before-talk (LBT) procedure.

4. The method of claim 1, wherein the at least one DCI comprises a field indicating the first starting symbol position within each of the multiple slots and the at least one DCI comprises a field indicating the second starting symbol position within each of the multiple slots.

5. The method of claim 1, further comprising adding different cyclic prefix (CP) extensions for the first UE within each of the multiple slots based on the corresponding first starting symbol position within each of the multiple slots and adding different CP extensions for the second UE within each of the one or more slots based on the corresponding second starting corresponding symbol position within each of the multiple slots.

6. The method of claim 1, wherein:
the first starting symbol position within each of the multiple slots comprises a sequence of first starting symbol positions associated with a first symbol hopping pattern; and the second starting symbol position within each of the one or more slots comprises a sequence of second starting symbol positions associated with a second symbol hopping pattern.

7. The method of claim 6, wherein the at least one DCI indicates the first symbol hopping pattern via a first symbol hopping pattern index value and the at least one DCI indicates the second symbol hopping patterns via a second symbol hopping pattern index value.

8. The method of claim 1, wherein the first starting symbol position and the second starting symbol position are associated with a gap of a predetermined length within the corresponding slot for the channel access procedure.

9. The method of claim 1, wherein the at least one DCI further indicates a channel access procedure type or a channel access priority class (CAPC) for the channel access procedure.

10. A method for wireless communications by a first user equipment (UE), comprising:
receiving, from a network entity, at least one downlink control information (DCI) scheduling multiple slots, wherein:
each of the multiple slots is an opportunity for the first UE to transmit in a physical sidelink shared channel (PSSCH); and the at least one DCI indicates a first starting symbol position within each of the multiple slots for the first UE to perform a channel access procedure; and
performing the channel access procedure in the starting symbol position in at least one of the multiple slots.

11. The method of claim 10, wherein the at least one DCI further indicates one or more parameters associated with the channel access procedure.

12. The method of claim 10, wherein the channel access procedure comprises a listen-before-talk (LBT) procedure.

13. The method of claim 10, wherein the at least one DCI comprises a field indicating the first starting symbol position within each of the multiple slots.

14. The method of claim 10, wherein:
the first starting symbol position within each of the multiple slots comprises a sequence of first starting symbol positions associated with a first symbol hopping pattern.

15. The method of claim 14, wherein the least one DCI indicates the first symbol hopping pattern via a first symbol hopping pattern index value.

16. The method of claim 10, further comprising:
transmitting a first transport block (TB) in a first PSSCH in a first slot of the multiple slots in which the first UE clears the channel access procedure; and
transmitting a second TB in a second PSSCH in a next slot of the multiple slots without regard to the first starting symbol position assigned to the first UE for that slot.

17. The method of claim 10, wherein:
the at least one DCI also indicates at least one of: a channel access procedure type or a channel access priority class (CAPC); and
performing the channel access procedure comprises performing the channel access procedure in accordance with the at least one of: the channel access procedure type or the CAPC.

18. The method of claim 10, further comprising:
detecting at least a second UE shares a channel occupancy time (COT) with the first UE; and
changing a type of the channel access procedure in response to the detection.

19. An apparatus for wireless communications by a first user equipment (UE), comprising:
a memory comprising computer executable instructions; and
at least one processor coupled to the memory, the at least one processor configured to execute the computer executable instructions and cause the apparatus to:
receive, from a network entity, at least one downlink control information (DCI) scheduling multiple slots, wherein:
each of the multiple slots is an opportunity for the first UE to transmit in a physical sidelink shared channel (PSSCH); and
the at least one DCI indicates a starting symbol position within each of the multiple slots for the first UE to perform a channel access procedure; and
perform the channel access procedure in the starting symbol position in at least one of the multiple slots.

20. The apparatus of claim 19, wherein the at least one DCI further indicates one or more parameters associated with the channel access procedure.

21. The apparatus of claim 19, wherein the first starting symbol position comprises a sequence of first starting symbol positions associated with a first symbol hopping pattern.

22. The apparatus of claim 19, wherein the at least one processor is further configured to cause the apparatus to:
transmit a first transport block (TB) in a first PSSCH in a first slot of the multiple slots in which the first UE clears the channel access procedure; and
transmit a second TB in a second PSSCH in a next slot of the multiple slots without regard to the first starting position assigned to the first UE for that slot.

23. The apparatus of claim 19, wherein the at least one processor is further configured to cause the apparatus to:
detect at least a second UE shares a channel occupancy time (COT) with the first UE; and
change a type of the channel access procedure in response to the detection.

24. An apparatus for wireless communications by a network entity, comprising:
a memory comprising computer executable instructions; and
at least one processor coupled to the memory, the at least one processor configured to execute the computer executable instructions and cause the apparatus to:
transmit, to a first user equipment (UE), at least one downlink control information (DCI) scheduling multiple slots, wherein:
each of the multiple slots is an opportunity for the first UE to transmit in a physical sidelink shared channel (PSSCH); and
the at least one DCI indicates a first starting symbol position within each of the multiple slots for the first UE to perform a channel access procedure; and
transmit, to a second UE, at least one DCI scheduling one or more slots of the multiple slots, wherein:
each of the one or more slots is an opportunity for the second UE to transmit a PSSCH; and
the at least one DCI indicates a second starting symbol position within each of the one or more slots for the second UE to perform the channel access procedure different than the first starting symbol position within the one or more slots for the first UE to perform the channel access procedure.

25. The method of claim 10, wherein the at least one DCI indicates a second starting symbol position within each of the multiple slots for a second UE to perform the channel access procedure, and wherein the second starting symbol position is different than the first starting symbol position within the multiple slots for the first UE to perform the channel access procedure.

26. The apparatus of claim 24, wherein the at least one DCI further indicates one or more parameters associated with the channel access procedure for the first UE and the at least one DCI further indicates one or more parameters associated with the channel access procedure for the second UE.

27. The apparatus of claim 24, wherein the channel access procedure comprises a listen-before-talk (LBT) procedure.

28. The apparatus of claim 24, wherein the at least one DCI comprises a field indicating the first starting symbol position within each of the multiple slots and the at least one DCI comprises a field indicating the second starting symbol position within each of the multiple slots.

29. The apparatus of claim 24, wherein the at least one processor is configured to cause the apparatus to add different cyclic prefix (CP) extensions for the first UE within each of the multiple slots based on the corresponding first starting symbol position with each of the multiple slots and adding different CP extensions for the second UE within each of the one or more slots based on the corresponding second starting corresponding symbol position within each of the multiple slots.

30. The apparatus of claim 24, wherein:
the first starting symbol position within each of the multiple slots comprises a sequence of first starting symbol positions associated with a first symbol hopping pattern; and
the second starting symbol position within each of the one or more slots comprises a sequence of second starting symbol positions associated with a second symbol hopping pattern.

31. The apparatus of claim 30, wherein the at least one DCI indicates the first symbol hopping pattern via a first symbol hopping pattern index value and the at least one DCI indicates the second symbol hopping patterns via a second symbol hopping pattern index value.

32. The apparatus of claim 24, wherein the first starting symbol position and the second starting symbol position are associated with a gap of a predetermined length within the corresponding slot for the channel access procedure.

33. The apparatus of claim 24, wherein the at least one DCI further indicates a channel access procedure type or a channel access priority class (CAPC) for the channel access procedure.

34. The apparatus of claim 19, wherein the channel access procedure comprises a listen-before-talk (LBT) procedure.

35. The apparatus of claim 19, wherein the at least one DCI comprises a field indicating the first starting symbol position within each of the multiple slots.

36. The apparatus of claim 21, wherein the least one DCI indicates the first symbol hopping pattern via a first symbol hopping pattern index value.

37. The apparatus of claim 19, wherein:
the at least one DCI also indicates at least one of: a channel access procedure type or a channel access priority class (CAPC); and
the at least one processor being configured to cause the apparatus to perform the channel access procedure comprises the at least one processor being configured to cause the apparatus to perform the channel access procedure in accordance with the at least one of: the channel access procedure type or the CAPC.

38. The apparatus of claim 19, wherein the at least one DCI indicates a second starting symbol position within each of the multiple for a second UE to perform the channel access procedure, and wherein the second starting symbol position is different than the first starting symbol position within the multiple slots for the first UE to perform the channel access procedure.

* * * * *